United States Patent
Baek et al.

(10) Patent No.: US 9,436,792 B2
(45) Date of Patent: Sep. 6, 2016

(54) METHOD OF DESIGNING LAYOUT OF INTEGRATED CIRCUIT AND METHOD OF MANUFACTURING INTEGRATED CIRCUIT

(71) Applicant: Samsung Electronics Co., Ltd., Suwon-si (KR)

(72) Inventors: Sang-hoon Baek, Seoul (KR); Tae-joong Song, Seongnam-si (KR); Sang-kyu Oh, Gwacheon-si (KR); Seung-young Lee, Incheon (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 14/820,983

(22) Filed: Aug. 7, 2015

(65) Prior Publication Data

US 2016/0055286 A1   Feb. 25, 2016

Related U.S. Application Data

(60) Provisional application No. 62/040,564, filed on Aug. 22, 2014.

(30) Foreign Application Priority Data

Mar. 4, 2015   (KR) .................. 10-2015-0030551

(51) Int. Cl.
  *G06F 17/50*   (2006.01)
  *G06F 19/00*   (2011.01)
  (Continued)

(52) U.S. Cl.
  CPC ....... *G06F 17/5077* (2013.01); *G06F 17/5081* (2013.01); *G03F 1/00* (2013.01); *G06F 17/5072* (2013.01); *G06F 19/00* (2013.01); *G06F 2217/12* (2013.01); *G21K 5/00* (2013.01)

(58) Field of Classification Search
  CPC .......... G06F 17/5072; G06F 17/5077; G06F 17/508; G06F 2217/121; G06F 19/00; G21K 5/00; G03F 1/00
  USPC ...... 716/54, 55, 53, 122, 129; 430/5; 378/35
  See application file for complete search history.

(56) References Cited

U.S. PATENT DOCUMENTS 6,054,872 A   4/2000  Fudanuki et al.
6,404,226 B1  6/2002  Schadt
(Continued)

FOREIGN PATENT DOCUMENTS

JP   05243535   9/1993
JP   H086231    1/1996
(Continued)

OTHER PUBLICATIONS

Sachiko et al., Machine English Translation of Japanese Document No. 2008-122948, Published on May 29, 2008, machine translated by JPO website on Apr. 7, 2016, 36 pages.*

*Primary Examiner* — Phallala Kik
(74) *Attorney, Agent, or Firm* — Onello & Mello, LLP.

(57) ABSTRACT

A method of designing a layout of an integrated chip (IC) includes designing a first layout by place and route a plurality of standard cells that define the IC, and generating a second layout by modifying the first layout during a mask data preparation process related to the first layout, wherein the second layout is generated by connecting first and second patterns from among first layer patterns that correspond to a first layer of the first layout, such that the number of masks necessary for forming the first layer patterns is reduced.

17 Claims, 21 Drawing Sheets

(51) Int. Cl.
*G21K 5/00* (2006.01)
*G03F 1/00* (2012.01)

(56) References Cited

U.S. PATENT DOCUMENTS

| | | | |
|---|---|---|---|
| 6,446,248 | B1 | 9/2002 | Solomon et al. |
| 6,922,217 | B2* | 7/2005 | Kim .................... G02F 1/13454 257/66 |
| 7,687,207 | B2 | 3/2010 | Graur et al. |
| 8,230,379 | B2 | 7/2012 | Kobayashi et al. |
| 8,495,548 | B2 | 7/2013 | Agarwal et al. |
| 8,726,215 | B2 | 5/2014 | Lee et al. |
| 9,046,955 | B1* | 6/2015 | Lee ....................... G06F 3/0412 |
| 9,236,343 | B2* | 1/2016 | Cicalo .................. H01L 23/481 |
| 9,256,130 | B2* | 2/2016 | Mo ....................... G02F 1/1339 |
| 2001/0038297 | A1* | 11/2001 | Or-Bach ............. G06F 17/5054 326/41 |
| 2004/0043550 | A1* | 3/2004 | Chakihara ....... H01L 21/823885 438/199 |
| 2007/0037070 | A1* | 2/2007 | Ohnuma ................. G03F 1/144 430/5 |
| 2008/0283872 | A1* | 11/2008 | Kubo .................. H01L 27/0203 257/209 |
| 2010/0138803 | A1 | 6/2010 | Minamiyama et al. |
| 2011/0070713 | A1* | 3/2011 | Nansei ................ H01L 27/0207 438/382 |
| 2011/0114912 | A1* | 5/2011 | Mikawa ................ H01L 27/101 257/4 |
| 2011/0233619 | A1* | 9/2011 | Tomita .................... G03F 1/38 257/225 |
| 2011/0278743 | A1* | 11/2011 | Chiu .................... H01L 23/522 257/786 |
| 2012/0278781 | A1* | 11/2012 | Wann .................. G06F 17/5068 716/122 |
| 2012/0313254 | A1* | 12/2012 | Rowhani ............... H01L 23/522 257/774 |
| 2013/0087834 | A1* | 4/2013 | Park .................... H01L 27/0207 257/204 |
| 2013/0161604 | A1* | 6/2013 | Huang ................ G02F 1/13458 257/43 |
| 2013/0334576 | A1* | 12/2013 | Park ...................... H01L 27/088 257/204 |
| 2014/0300399 | A1* | 10/2014 | Miyake .................. G09G 3/3677 327/296 |
| 2014/0332979 | A1* | 11/2014 | Cicalo .................. H01L 23/481 257/774 |
| 2015/0234974 | A1* | 8/2015 | Dechene ............ G06F 17/5081 716/52 |
| 2015/0339425 | A1* | 11/2015 | Huang .................... G06F 17/50 716/122 |
| 2015/0348959 | A1* | 12/2015 | Clark, Jr. ............. H01L 27/1211 257/350 |
| 2016/0043065 | A1* | 2/2016 | Ken ......................... G03F 1/50 438/15 |

FOREIGN PATENT DOCUMENTS

| | | |
|---|---|---|
| JP | 09237840 | 9/1997 |
| JP | 2002151594 | 5/2002 |
| JP | 2003037165 | 2/2003 |
| JP | 2008122948 | 5/2008 |

* cited by examiner

METHOD OF DESIGNING LAYOUT OF INTEGRATED CIRCUIT AND METHOD OF MANUFACTURING INTEGRATED CIRCUIT

CROSS-REFERENCE TO RELATED APPLICATIONS

This application claims the benefit of U.S. Patent Application No. 62/040,564, filed on Aug. 22, 2014, in the U.S. Patent and Trademark Office, and Korean Patent Application No. 10-2015-0030551, filed on Mar. 4, 2015, in the Korean Intellectual Property Office, the disclosures of which are incorporated herein in their entirety by reference.

BACKGROUND

The inventive concepts relate to an integrated circuit (IC), and more particularly, to a method of designing a layout of an IC including at least one standard cell and a method of manufacturing the IC.

Semiconductor IC design is a process of converting a chip behavior model that describes desired operations of a semiconductor system to a specific structure model that describes a connection between essential components of the semiconductor system. In such a semiconductor IC design, process generation and use of a library of cells to be included in the semiconductor IC may be advantageous in terms of design efficiency and cost reduction in semiconductor IC design and implementation.

SUMMARY

According to an aspect of the inventive concepts, there is provided a method of designing a layout of an integrated chip (IC), the method including designing a first layout by placing and routing a plurality of standard cells that define the IC, and generating a second layout by modifying the first layout during a mask data preparation process related to the first layout. The second layout is generated by connecting first and second patterns from among first layer patterns corresponding to a first layer of the first layout, such that the number of masks necessary for forming the first layer patterns is reduced.

The first and second patterns may be positioned in parallel to each other in a first direction and extend in a second direction that is substantially perpendicular to the first direction.

The generating of the second layout may include generating the second layout including a new pattern that is generated by merging the first and second patterns, has a first width that is greater than respective widths of the first and second patterns in the first direction, and is formed using a single mask.

The generating of the second layout may include generating the second layout including a new pattern that includes the first and second patterns and a bridge pattern connecting the first and second patterns together, using a cross-connecting pattern, and is formed using a single mask.

The generating of the second layout may include generating the second layout including new first and second patterns that have a smaller height in the second direction than the first and second patterns and are formed using a single mask, and a second layer that is commonly connected to the new first and second patterns.

The first layout may further include a plurality of conductive lines that are positioned in parallel to the first and second patterns. The second layer may be a contact that is to be formed on at least one selected from the plurality of conductive lines and on the new first and second patterns.

The generating of the second layout may include generating the second layout that includes a new first pattern that has a smaller height than the first and second patterns in the second direction such that a distance between the new first pattern and a third pattern from among the first layer patterns is the same or greater than a threshold distance. The new first pattern and the third pattern are formed using the same mask; and a second layer having a form of a bridge that connects the new first pattern and the second pattern.

The first layout may further include a plurality of conductive lines that are positioned in parallel to the first and second patterns. The second layer may be a contact that is to be formed on the new first pattern, the second pattern, and at least one selected from the plurality of conductive lines.

The first layer may comprise a contact that is electrically connected to an active area of the IC and is to be formed on the active area.

The first and second patterns may respectively correspond to first and second power contact patterns.

The first and second power contact patterns may be included in a first standard cell, and patterns other than the first and second power contact patterns from among the first layer patterns may be included in a second standard cell that is adjacent to the first standard cell in a second direction in which the first and second patterns extend.

The first power contact pattern may be included in a first standard cell, the second power contact pattern may be included in a second standard cell that is adjacent to the first standard cell in a first direction, and patterns other than the first and second power contact patterns from among the first layer patterns may be included in a third standard cell that is adjacent to one of the first and second standard cells in a second direction in which the first and second patterns extend.

According to another aspect of the inventive concepts, there is provided a method of manufacturing an integrated circuit (IC), the method including providing a standard cell library that includes information about a plurality of standard cells that define the IC; designing a first layout by placing and routing the plurality of standard cells; determining, during a mask data preparation process related to the first layout, whether the number of masks necessary for forming first layer patterns that correspond to a first layer of the first layout is the same or greater than a threshold value; generating, when the number of masks necessary for forming the first layer patterns is the same or greater than the threshold value, the second layout by modifying the first layout; and forming the IC based on the second layout.

The forming of the IC may include modifying the second layout by performing optical proximity correction (OPC) based on the second layout; manufacturing a plurality of masks based on the modified second layout; and forming the IC by using the plurality of masks.

The method may further include forming the IC based on the first layout when the number of masks necessary for forming the first layer patterns is less than the threshold value.

According to another aspect of the inventive concepts, there is provided a method of designing a layout of a standard cell of an integrated circuit (IC), the method comprising; configuring a first layout by placing and routing a standard cell, the standard cell including first and second patterns from among first layer patterns corresponding to a first layer of the first layout; and configuring a second layout by modifying the first layout by connecting the first and second patterns among the first layer patterns so that the number of masks required to form the first layer patterns of the standard cell according to the second layout is reduced relative to the number of masks required to form the first layer patterns of the standard cell according to the first layout.

The first and second patterns may be positioned in parallel to each other in a first direction and extend in a second direction that is substantially perpendicular to the first direction, and wherein the configuring of the second layout comprises at least one of: configuring the second layout comprising a new pattern that is generated by merging the first and second patterns, has a first width that is greater than respective widths of the first and second patterns in the first direction, and is formed using a single mask; configuring the second layout comprising a new pattern that includes the first and second patterns and a bridge pattern connecting the first and second patterns together using a cross-connecting pattern, and is formed using a single mask; or configuring the second layout comprising new first and second patterns that have a smaller height in the second direction than the first and second patterns and are formed using a single mask, and a second layer that is commonly connected to the new first and second patterns.

The first and second patterns may be positioned in parallel to each other in a first direction and extend in a second direction that is substantially perpendicular to the first direction, and wherein the configuring of the second layout comprises generating the second layout that comprises: a new first pattern that has a smaller height than the first and second patterns in the second direction such that a distance between the new first pattern and a third pattern from among the first layer patterns is the same or greater than a threshold distance, wherein the new first pattern and the third pattern are formed using the same mask; and a second layer having a form of a bridge that connects the new first pattern and the second pattern.

The first layout may further comprise a plurality of conductive lines that are positioned in parallel to the first and second patterns, and the second layer is a contact that is to be formed on the new first pattern, the second pattern, and at least one selected from the plurality of conductive lines.

The first layer may comprise a contact that is electrically connected to an active area of the IC and is to be formed on the active area and wherein the first and second patterns respectively correspond to first and second power contact patterns.

BRIEF DESCRIPTION OF THE DRAWINGS

Exemplary embodiments of the inventive concepts will be more clearly understood from the following detailed description taken in conjunction with the accompanying drawings in which.

DETAILED DESCRIPTION OF EMBODIMENTS

Figure 1:
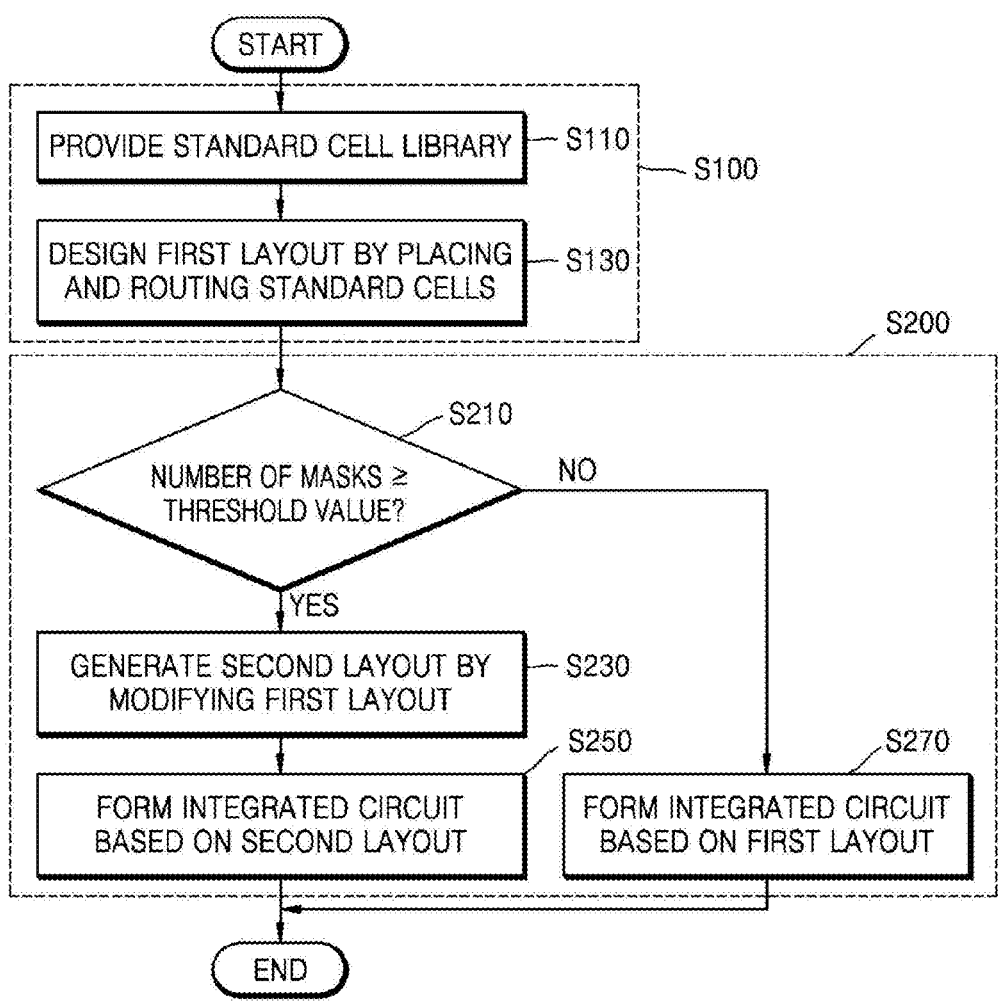
FIG. 1 is a flowchart illustrating a method of manufacturing an integrated circuit (IC), according to according to an exemplary embodiment of the inventive concepts.

The inventive concepts will now be described more fully with reference to the accompanying drawings, in which exemplary embodiments of the inventive concepts are shown. The exemplary embodiments are provided so that this disclosure will be thorough and complete, and will fully convey the concept of the inventive concepts to those skilled in the art. However, this is not intended to limit the inventive concepts to particular modes of practice, and it is to be appreciated that all changes, equivalents, and substitutes that do not depart from the spirit and technical scope are encompassed in the inventive concept.

Like reference numerals in the drawings denote like elements. Sizes of components in the drawings may be exaggerated for clarity. As used herein, the term "and/or" includes any and all combinations of one or more of the associated listed items. Expressions such as "at least one of," when preceding a list of elements, modify the entire list of elements and do not modify the individual elements of the list.

The terms used in the present specification are merely used to describe particular embodiments, and are not intended to limit the inventive concept. An expression used in the singular encompasses the expression of the plural, unless it has a clearly different meaning in the context. In the present specification, it is to be understood that the terms such as "including," "having," and "comprising" are intended to indicate the existence of the features, numbers, steps, actions, components, parts, or combinations thereof disclosed in the specification, and are not intended to preclude the possibility that one or more other features, numbers, steps, actions, components, parts, or combinations thereof may exist or may be added.

While such terms as "first," "second," etc., may be used to describe various components, such components are not limited to the above terms. The above terms are used only to distinguish one component from another. For example, within the scope of the present inventive concepts, a first component may be referred to as a second component, and vice versa.

Unless defined otherwise, all teems used in the exemplary embodiments including technical or scientific terms have the same meaning as generally understood by one of ordinary skill in the art. It will be further understood that terms, such as those defined in commonly used dictionaries, should be interpreted as having a meaning that is consistent with their meaning in the context of the related art, and should not be interpreted as having ideal or excessively formal meanings unless it is clearly defined in the specification.

An integrated circuit (IC) may be defined by using a plurality of cells, in particular, may be designed by using a cell library that includes property information regarding the plurality of cells. The cell library refers to a set of associated files, in which names, dimensions, gate widths, pins, delay properties, leakage currents, threshold voltages, and functions of cells may be defined, along with other cell parameters. A general cell library set may include a basic cell, such as AND, OR, NOR, and inverter, a complex cell such as OAI (OR/AND/INVERTER) and AOI (AND/OR/INVERTER), and a storage element such as a simple master-slaver flip-flop and a latch.

According to example embodiments described herein, the cell library may comprise a standard cell library. In a method utilizing such a standard cell library, logic circuit blocks (or cells) with multiple functions are prepared in advance, and then are arbitrarily combined to design a large-scale integrated circuit (LSI) satisfying a customer's or a user's specifications. These previously created existing cells are registered with a computer through verification, and then are subjected to logic design, arrangement, and a wiring process through combination of the cells using a computer-aided design (CAD) tool.

In particular, in the designing or manufacturing of an LSI, in a case where previously created existing standard logic circuit blocks (or cells) are stored in a library, appropriate logic circuit blocks for the purpose of the design may be chosen from the library, and arranged on a chip in a plurality of cell rows, and then an optimal wiring, for example with a shortest wiring length may be laid out in a wiring space between cells, thereby completing the manufacture of the LSI. With an increased number of different types of cells available in a given library, there is increased design flexibility, and optimal chip design is more readily achieved.

Such an IC using a standard cell is a kind of semi-custom-made IC, which may be manufactured by selection of previously created existing standard cells stored in a library and arrangement and minimal wiring of the standard cells. Thus, development costs and development time span may be reduced as compared with the cost and development time of full-custom-made ICs.

FIG. 1 is a flowchart illustrating a method of manufacturing an IC, according to according to an exemplary embodiment of the inventive concepts.

Referring to FIG. 1, a method of manufacturing an IC according to the present exemplary embodiment may be partitioned into an IC design process S100 and an IC manufacturing process S200. In some embodiments, the IC design process S100 includes operations S110 and S130, and is for designing a layout of the IC. In some embodiments, the IC design process S100 may be performed using an IC design tool. In some embodiments, the IC design tool may be a program including a plurality of commands executed in a processor. In some embodiments, the IC manufacturing process S200 includes operations S210 to S270, and is for manufacturing the IC based on the designed layout. In some embodiments, the IC manufacturing process S200 may be performed in a semiconductor manufacturing module. Hereinafter, operations in the IC design process S100 and the IC manufacturing process S200 will be described in detail.

In operation S110, a standard cell library is provided. The standard cell library may include information regarding a plurality of standard cells, and may be stored in a computer-readable storage medium. The standard cell library may provide layout information and timing information regarding the standard cells. Examples of standard cells will be described in detail herein in connection with reference to FIG. 2.

In operation S130, a first layout is designed by placing and routing the standard cells using the standard cell library. Exemplary embodiments of systems, methods and configurations for designing the first layout by placing and routing the standard cells will be described in detail herein with reference to FIGS. 7A to 7D.

Specifically, in some embodiments, input data that defines the IC is received. The input data may be data generated by synthesizing an abstract type of behavior of the IC, for example, data defined by a register-transfer level (RTL), by using the standard cell library. For example, the input data may be a bitstream or a netlist generated by synthesizing an IC defined by a Hardware Description Language (HDL) such as a VHSIC HDL (VHDL) and Verilog.

Next, a storage medium that stores the standard cell library is accessed, and standard cells, which are selected according to the input data from among the standard cells stored in the standard cell library, are placed and routed. Here, for purposes of the present description "place and route" refers to an operation of disposing, or placing, the selected standard cells and connecting the disposed standard cells. When the placing and routing is finished, an initial layout or an original layout of the IC may be generated. Herein, for purposes of the present description, the initial layout, or the original layout, is referred to as a "first layout."

In some embodiments, The IC design process S100 may include operations S110 and S130 described above. However, exemplary embodiments are not limited thereto. The IC design process S100 may further include various operations in a general IC design method, such as generating the standard cell library, modifying the standard cell library, layout verification, and post simulation.

In operation S210, a determination is made as to whether the number of masks necessary for forming patterns corresponding to a first layer of the first layout is the same or greater than a threshold value. In particular, operation S210 may be performed during a mask data preparation process related to the first layout. In some embodiments, the mask data preparation process is preparing to perform optical proximity correction (OPC) by gathering overall data about the first layout that is designed in the IC design process S100. According to the determination result, if the number of masks necessary for forming the patterns corresponding to the first layer is the same or greater than the threshold value, operation S230 is performed; if not, operation S270 is performed.

In operation S230, a second layout is generated by modifying the first layout. Specifically, operation S230 may be performed during the mask data preparation process related to the first layout with operation S210. The operation of generating the second layout by modifying the first layout in the mask data preparation process may be referred to as design polishing. A detailed description of the design polishing will be provided below with reference to FIGS. 8 to 13.

In operation S250, the IC is manufactured based on the second layout. In further detail, first, the second layout is modified by performing OPC based on the second layout. OPC refers to a process of modifying the second layout by compensating for errors due to an optical proximity effect. In a case where the second layout is used as it is to manufacture a mask and photolithography is performed by using the manufactured mask, different patterns may be created due to the optical proximity effect. Therefore, a pattern that is the same as the second layout may be formed by modifying the second layout by compensating for the errors due to the optical proximity effect, and by manufacturing a mask based on the modified second layout and then performing photolithography.

Next, in some embodiments, a mask is manufactured according to the second layout that is modified according to the OPC result, and the IC is manufactured by using the mask. A mask is manufactured by using a layout with regard to OPC, for example, a graphic design system (GDS) with regard to OPC, and then, by using the manufactured mask, the IC may be manufactured on a wafer by performing photolithography.

In operation S270, the IC is manufactured based on the first layout. Operation S270 may be performed in a substantially similar manner to operation S250. That is, the first layout is modified by performing OPC based on the first layout, a mask is manufactured according to the first layout modified according to the OPC result, and the IC is manufactured by using the mask.

Figure 2:
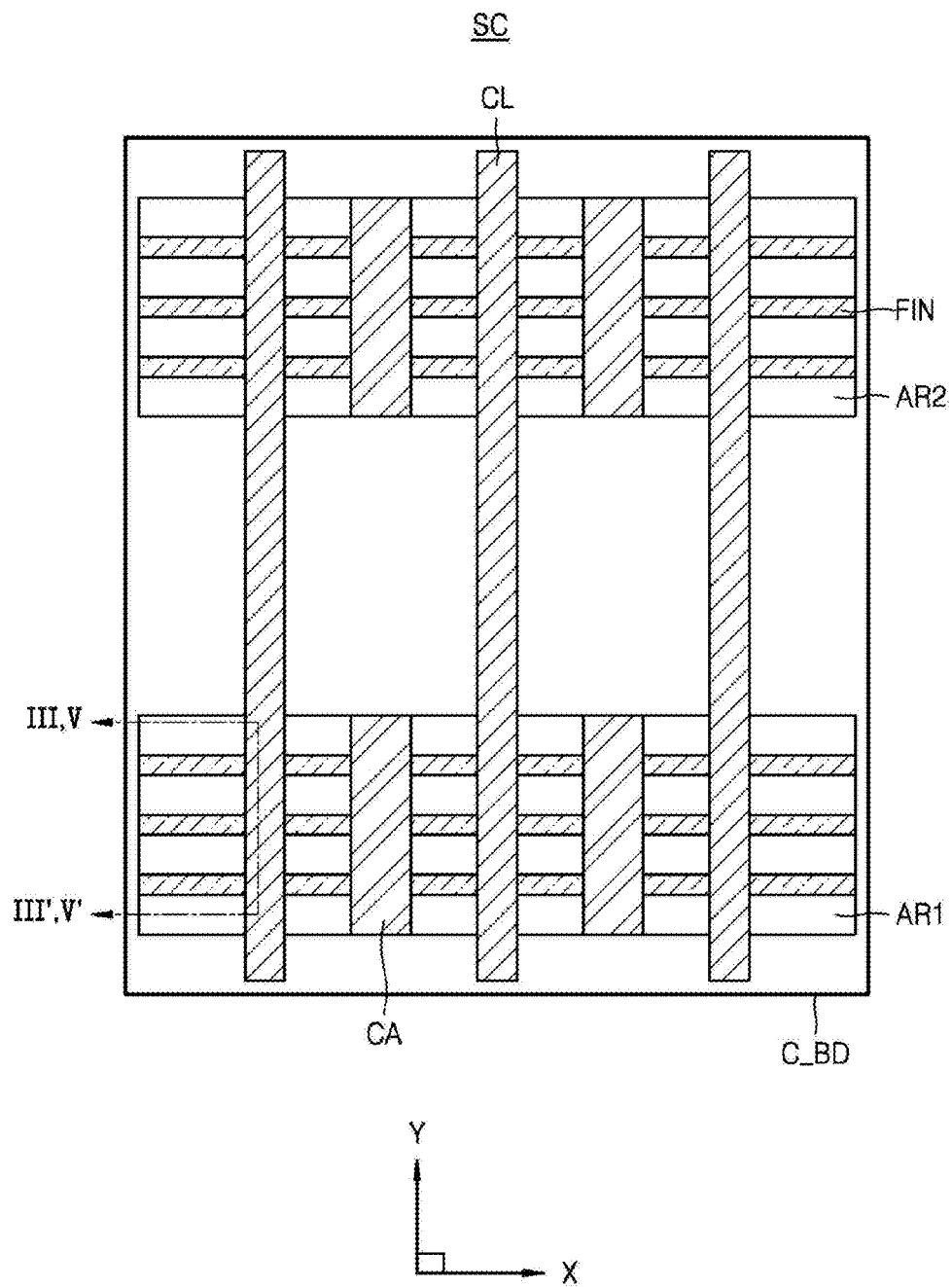
FIG. 2 is an example of a layout of standard cell.

FIG. 2 is an example layout of a standard cell SC.

Referring to FIG. 2, the standard cell SC is defined by a cell boundary C_BD, a plurality of fins FIN, first and second active areas AR1 and AR2, a plurality of conductive lines CL, and a plurality of first contacts CA. In some embodiments, the cell boundary C_BD is an outline that defines the standard cell SC. A place and route tool may detect the standard cell SC based on the cell boundary C_BD. In some embodiments, the cell boundary C_BD includes four cell boundary lines.

In some embodiments, the plurality of fins FIN may extend in a first direction (e.g., X direction), and may be disposed in parallel to one another along a second direction that is perpendicular to the first direction (e.g., Y direction). The first active area AR1 and the second active area AR2 may be parallel to one another and be foi wed of different conductivity types. According to the present exemplary embodiment, three fins FIN may be disposed in each of the first and second active areas AR1 and AR2. However, exemplary embodiments are not limited thereto, and various numbers of fins FIN may be disposed in each of the first and second active areas AR1 and AR2.

The plurality of fins FIN disposed in the first and second active areas AR1 and AR2 may be referred to as active fins. Although only active fins are illustrated in FIG. 2, exemplary embodiments are not limited thereto. For example, in some embodiments, the standard cell SC may further include dummy fins that are disposed between the cell boundary CBD and the first active area AR1, an area between the first and second active areas AR1 and AR2, or an area between the second active area AR2 and the cell boundary C_BD.

The plurality of conductive lines CL may extend in the second direction (e.g., Y direction), and be disposed in parallel to one another in the first direction (e.g., X direction). In some embodiments, the conductive lines CL may be formed of a material having electrical conductivity, for example, polysilicon, metal, or a metal alloy.

According to an exemplary embodiment, the conductive lines CL may correspond to gate electrodes. However, exemplary embodiments are not limited thereto, and the conductive lines CL may be conductive traces. Also, in the present example, although the standard cell SC includes three conductive lines CL in FIG. 2, this is only an exemplary embodiment. In some embodiments, the standard cell SC may include four or more conductive lines that extend in the second direction and are disposed in parallel to one another in the first direction.

The plurality of first contacts CA may be disposed on the first and second active areas AR1 and AR2, and may be electrically connected to the first and second active areas AR1 and AR2. According to an exemplary embodiment, the plurality of first contacts CA may be source/drain contacts. According to another exemplary embodiment, the plurality of first contacts CA may be power contacts. Although not illustrated, the standard cell SC may further include a second contact that is disposed on the plurality of conductive lines CL and electrically connected to the plurality of conductive lines CL.

Figure 3:
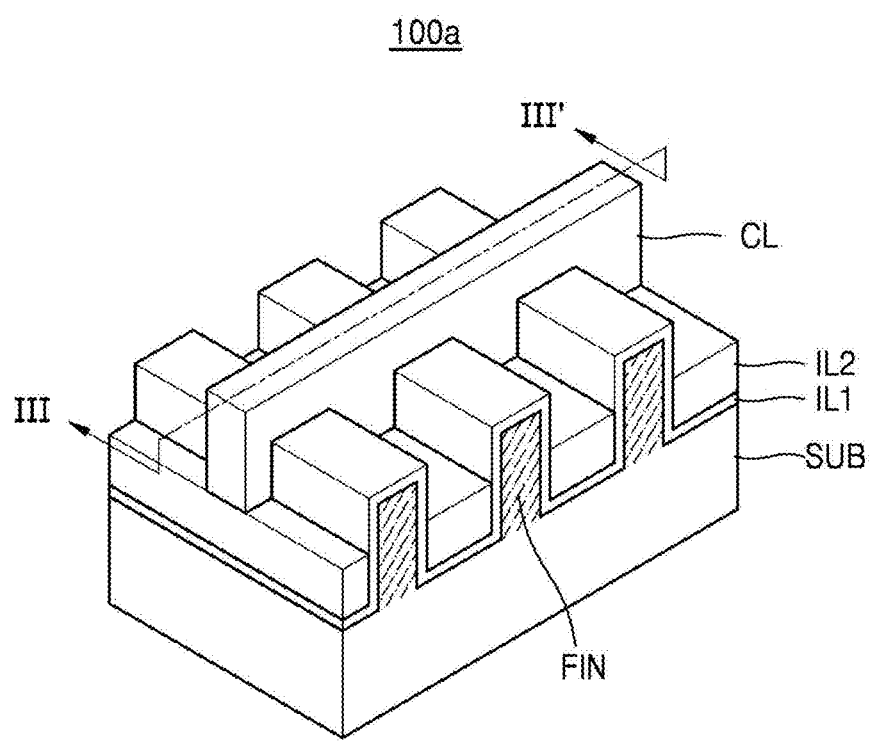
FIG. 3 is an exemplary perspective view of a semiconductor device having the layout of FIG. 2.
Figure 4:
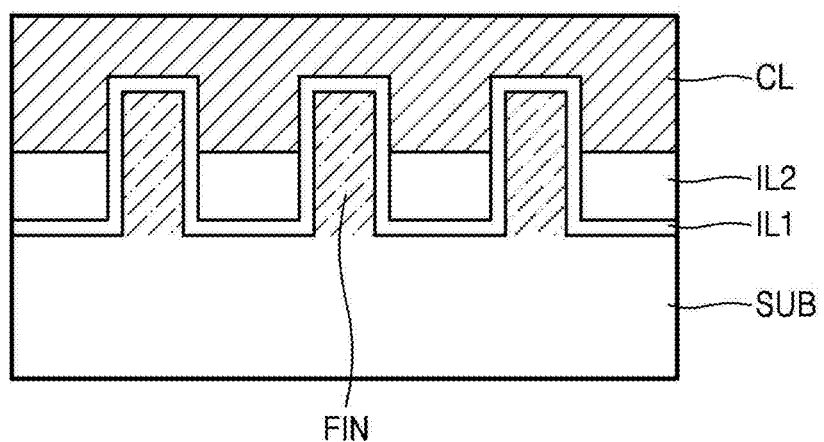
FIG. 4 is a cross-sectional view cut along the line III-III' of FIG. 2.

FIG. 3 is an exemplary perspective view of a semiconductor device 100a having the layout of FIG. 2. FIG. 4 is a cross-sectional view cut along the line of FIG. 2.

Referring to FIGS. 3 and 4, the semiconductor device 100a may be a bulk-type fin transistor. The semiconductor device 100a may include a substrate SUB, a first insulating layer ILL a second insulating layer IL2, first to third fins FIN, and a conductive line (hereinafter, referred to as "'gate electrode") CL.

The substrate SUB may be a semiconductor substrate that includes a material selected from, for example, silicon, silicon-on-insulator (SOI), silicon-on-sapphire (SOS), germanium, silicon germanium, and gallium arsenide. In some embodiments, the substrate SUB may be a p-type substrate and may be used as the first active area AR1.

The first to third fins FIN may be arranged such that they are connected to the substrate SUB. According to an exemplary embodiment, protruding portions of the first to third fins FIN that are perpendicular with respect to the substrate SUB may be n+ or p+ doped active regions.

The first and second insulating layers ILA and IL2 may comprise an insulating material that includes, in some embodiments, one selected from, for example, an oxide, a nitride, or an oxynitride. The first insulating layer IL1 may be disposed on the first to third fins FIN. The first insulating layer IL1 may be disposed among the first to third fins FIN and the gate electrode CL, and thus, may be used as a gate insulating layer. The second insulating layer IL2 may be disposed in a space among the first to third fins FIN to have a predetermined height. The second insulating layer IL2 may be disposed among the first to third fins FIN, and thus, may be used as a device isolation layer.

In some embodiments, the gate electrode CL may be arranged on the first and second insulating layers IL1 and IL2 to have a structure such that it surrounds the first to third fins FIN, the first insulating layer ILL and the second insulating layer IL2. i.e., a structure including the first to third fins FIN in the gate electrode CL. In some embodiments, the gate electrode CL may include at least one metallic material such as tungsten (W) and tantalum (Ta), a nitride thereof, a silicide thereof, and a doped polysilicon. In some embodiments, the gate electrode CL may be formed using a deposition process.

Figure 5:
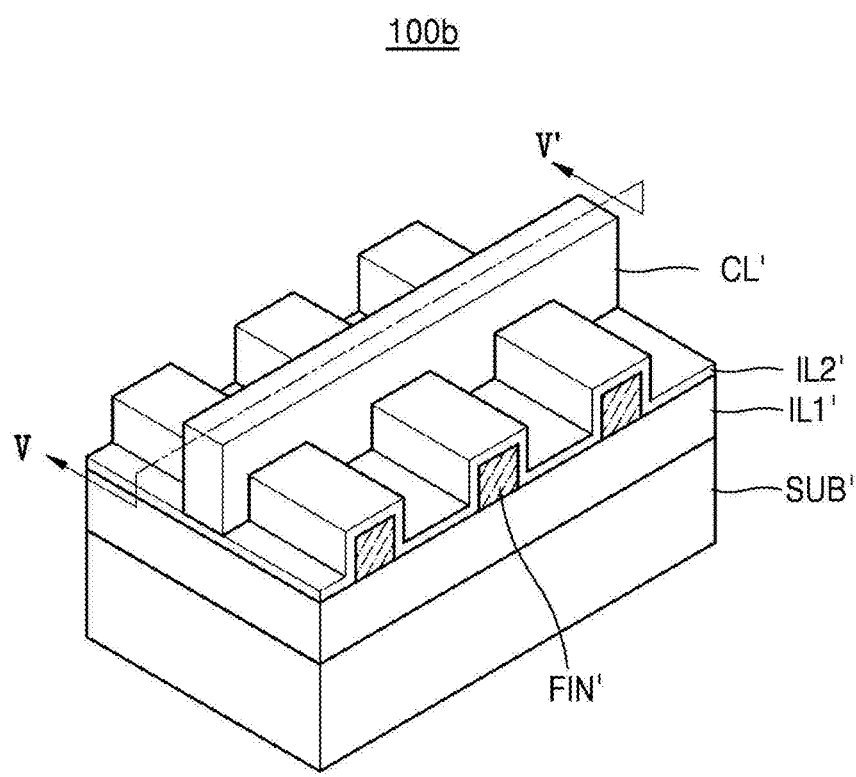
FIG. 5 is another exemplary perspective view of a semiconductor device having the layout of FIG. 2.
Figure 6:
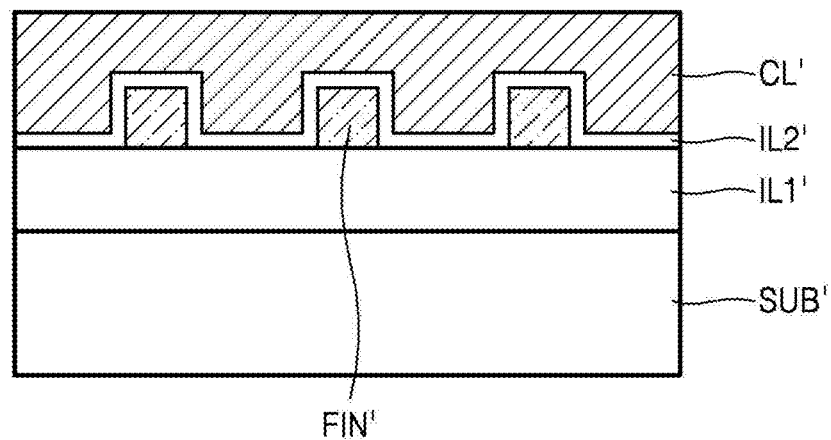
FIG. 6 is a cross-sectional view cut along the line V-V' of FIG. 5.

FIG. 5 is another exemplary perspective view of a semiconductor device 100*b* having the layout of FIG. 2. FIG. 6 is a cross-sectional view cut along the line V-V' of FIG. 5.

Referring to FIGS. 5 and 6, the semiconductor device 100*b* may be an SOT-type fin transistor. The semiconductor device 100*b* may include a substrate SUB', a first insulating layer IL1', a second insulating layer IL2', first to third fins FIN', and a conductive line (herein, referred to as "gate electrode") CL'. Since the semiconductor device 100*b* according to the present exemplary embodiment is a modified exemplary embodiment of the semiconductor device 100*a* of FIGS. 3 and 4, hereinafter, only the difference between the semiconductor devices 100*a* and 100*b* will be described, and similar features will not be repeatedly described.

The first insulating layer ID' may be positioned on the substrate SUB'. The second insulating layer IL2' may be positioned between the first to third fins FIN' and the gate electrode CL', and thus, may be used as a gate insulating layer. In some embodiments, the first to third fins FIN' may comprise a semiconductor material, for example, silicon or doped silicon.

The gate electrode CL' may be arranged on the second insulating layer IL2' to have a structure surrounding the first to third fins FIN' and the second insulating layer IL2', i.e., a structure including the first to third fins FIN' in the gate electrode CL'.

FIGS. 7A to 7D are exemplary first layouts 10*a* to 10*d* of a portion of an IC that includes two adjacent standard cells.

FIGS. 7A to 7D are exemplary embodiments of operation S130 of FIG. 1. First and second standard cells SC1 and SC2 may be disposed near, or neighboring, one another in a second direction (e.g., Y direction) by using a place and route tool. Specifically, by using the place and route tool, selected first and second standard cells SC1 and SC2 are disposed, the disposed first and second standard cells SC1 and SC2 are connected to each other, and thus, the first layouts 10*a* to 10*d* shown in FIGS. 7A to 7D may be designed. For convenience, the plurality of fins FIN of FIG. 2 are not illustrated in the first layouts 10*a* to 10*d* of FIGS. 7A to 7D.

Figure 7A:
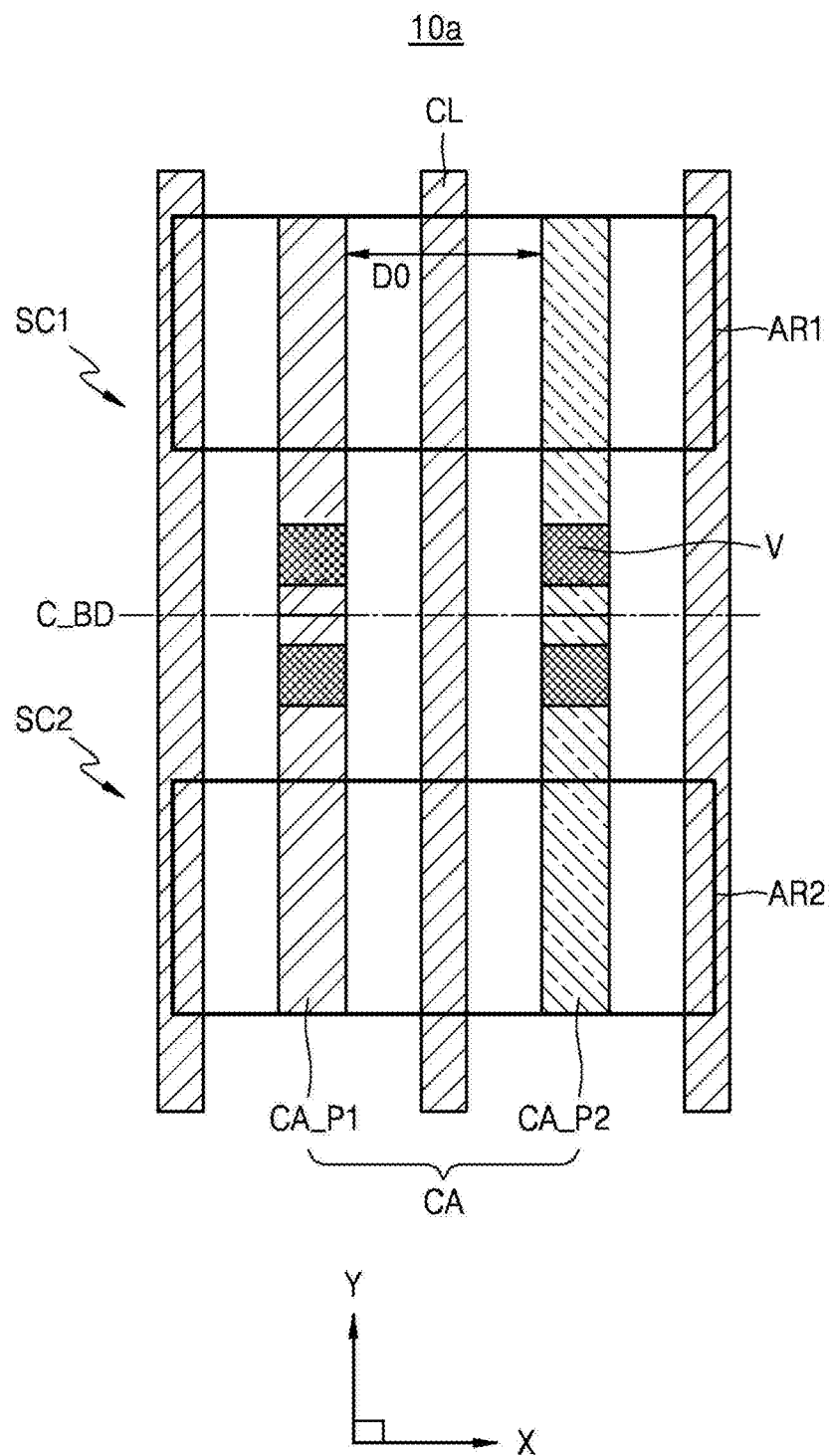
FIGS. 7A to 7D are exemplary layouts of a portion of an IC that includes two adjacent standard cells.

Referring to FIG. 7A, the first layout 10*a* may include a first standard cell SC1 and a second standard cell SC2 that are disposed near or neighboring one another in the second direction. According to the present exemplary embodiment, a first contact CA of the first standard cell SC1 may include first and second power contact patterns CA_P1 and CA_P2, and a first contact CA of the second standard cell SC2 may also include the first and second power contact patterns CA_P1 and CA_P2.

By using the place and route tool, the first power contact patterns CA_P1 in the first and second standard cells SC1 and SC2 may be connected to each other, and likewise, the second power contact patterns CA_P2 in the first and second standard cells SC1 and SC2 may be connected to each other. Therefore, the first layout 10*a* may include a single first power contact pattern CA_P1 and a single second power contact pattern CA_P2.

In the first layout 10*a*, the first power contact pattern CA_P1 and the second power contact pattern CA_P2 may form the first contact CA. In detail, as a semiconductor device is scaled down, a distance D0 between the first and second power contact patterns CA_P1 and CA_P2 may be less than a patterning resolution limit, and thus, the first and second power contact patterns CA_P1 and CA_P2 may not be fainted using a single mask. Therefore, two masks are necessary to form the first contact CA that includes the first and second power contact patterns CA_P1 and CA_P2.

Figure 7B:
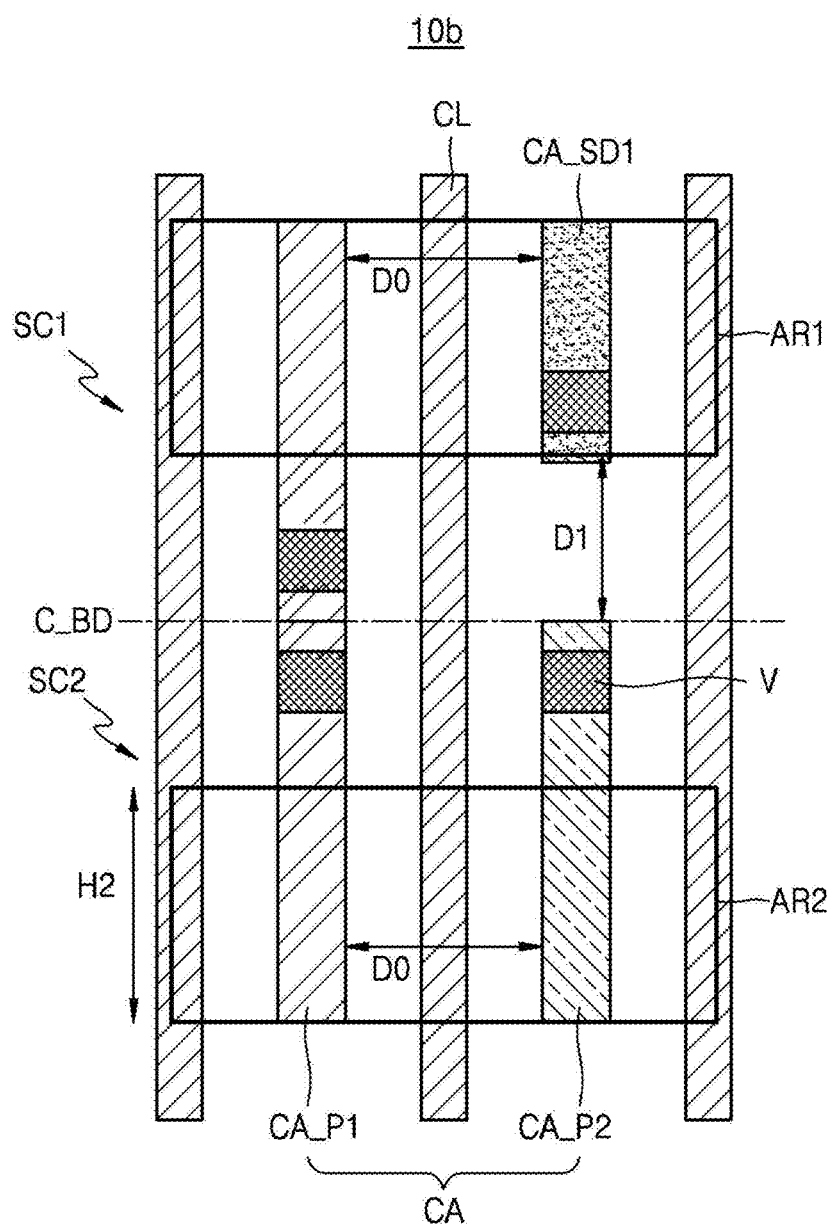

Referring to FIG. 7B, the first layout 10*b* may include a first standard cell SC1 and a second standard cell SC2 that are disposed near or neighboring one another in the second direction. According to the present exemplary embodiment, a first contact CA of the first standard cell SC1 may include a first power contact pattern CA_P1 and a first source/drain contact pattern CA_SD1, and a first contact CA of the second standard cell SC2 may include the first power contact pattern CA_P1 and a second power contact pattern CA_P2.

By using the place and route tool, the first power contact patterns CA_P1 in the first and second standard cells SC1 and SC2 may be connected to each other. However, in some case, it is possible that the first source/drain contact pattern CA_SD1 in the first standard cell SC1 and the second power contact pattern CA_P2 in the second standard cell SC2 may not be connected to each other because different voltages are to be applied thereto during operation. Therefore, the first layout 10*b* may include a single first power contact pattern CA_P1, the first source/drain contact pattern CA_SD1, and the second power contact pattern CA_P2.

In the first layout 10*b*, the first power contact pattern CA_P1, the first source/drain contact pattern CA_SD1, and the second power contact pattern CA_P2 may form the first contact CA. In detail, as a semiconductor device is scaled down, a distance D0 between the first and second power contact patterns CA_P1 and CA_P2 may be less than a patterning resolution limit, and thus, the first and second power contact patterns CA_P1 and CA_P2 may not be formed using a single mask.

Also, in some embodiments, a distance D1 between the first source/drain contact pattern CA_SD1 and the second power contact pattern CA_P2 may be less than the patterning resolution limit, and thus, the first source/drain contact pattern CA_SD1 and the second power contact pattern CA_P2 may not be formed using a single mask. Therefore, three masks are necessary to form the first contact CA that includes the first power contact pattern CAP 1, the first source/drain contact pattern CA_SD1, and the second power contact pattern CA_P2.

Figure 7C:
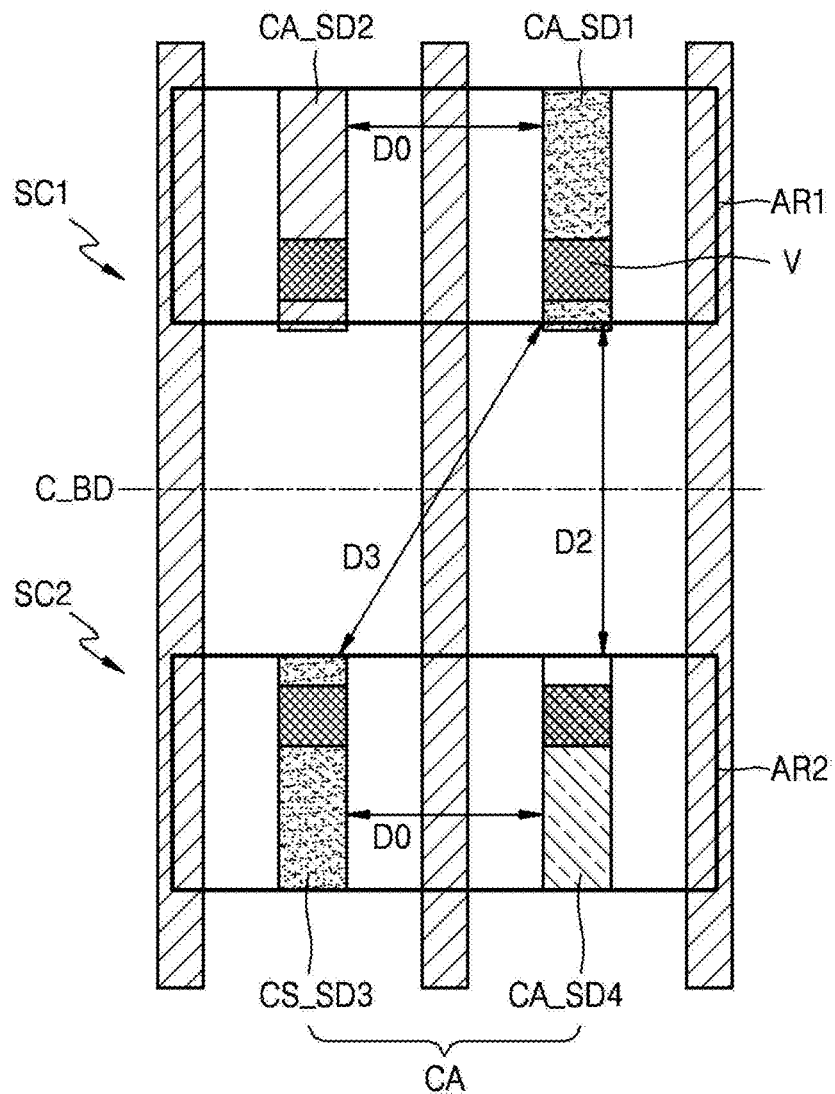

Referring to FIG. 7C, the first layout 10*c* may include a first standard cell SC1 and a second standard cell SC2 that are positioned near or neighboring one another in the second direction. According to the present exemplary embodiment, a first contact CA of the first standard cell SC1 may include first and second source/drain contact patterns CA_SD1 and CA_SD2, and a first contact CA of the second standard cell SC2 may include third and fourth source/drain contact patterns CA_SD3 and CA_SD4.

Since, in some configurations, different voltages may be applied to the first and second source/drain contact patterns CA_SD1 and CA_SD2 in the first standard cell SC1 and the third and fourth source/drain contact patterns CA_SD3 and CA_SD4 in the second standard cell SC2, in such a case, they are not connected to one another. Therefore, the first layout 10*c* may include the first to fourth source/drain contact patterns CA_SD1 to CA_SD4.

In the first layout 10*c*, the first to fourth source/drain contact patterns CA_SD1 to CA_SD4 may form the first contact CA. In detail, as a semiconductor device is scaled down, a distance D0 between the first and second source/drain contact patterns CA_SD1 and CA_SD2 may be less than a patterning resolution limit, and thus, the first and second source/drain contact patterns CA_SD1 and CA_SD2 may not be formed using a single mask. Likewise, a distance D0 between the third and fourth source/drain contact patterns CA_SD3 and CA_SD4 may be less than the patterning resolution limit, and thus, the third and fourth source/drain contact patterns CA_SD3 and CA_SD4 may not be formed using a single mask.

Also, a distance D2 between the first and fourth source/drain contact patterns CA_SD1 and CA_SD4 may be less than the patterning resolution limit, and thus, the first and fourth source/drain contact patterns CA_SD1 and CA_SD4 may not be formed using a single mask. On the other hand, a distance D3 between the first and third source/drain contact patterns CA_SD1 and CA_SD3 may be greater than the patterning resolution limit, and thus, the first and third source/drain contact patterns CA_SD1 and the CA_SD3 may be formed using a single mask. Therefore, in this example embodiment, three masks are necessary to form the first contact CA that includes the first to fourth source/drain contact patterns CA_SD1 to CA_SD4.

Figure 7D:
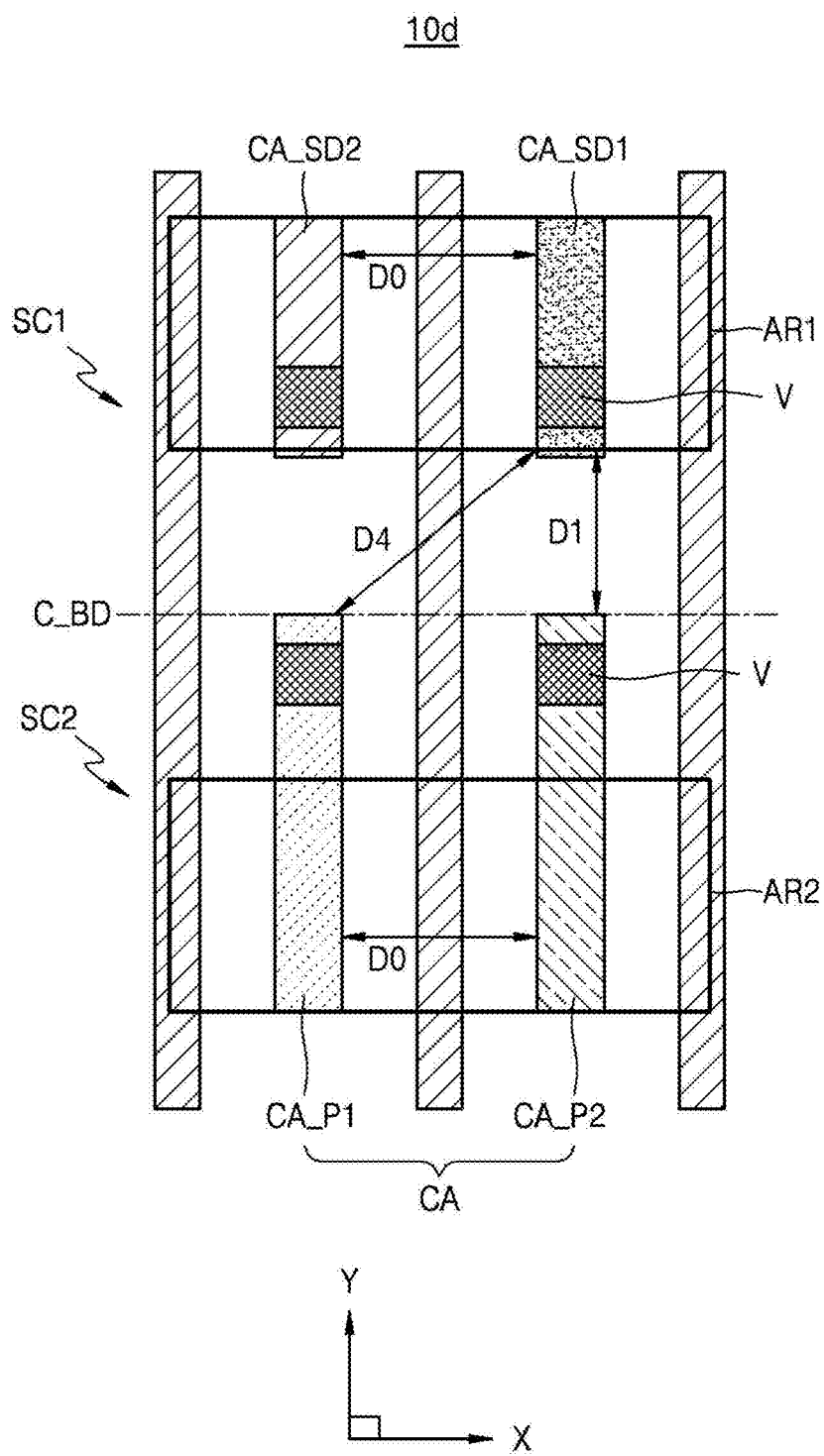

Referring to FIG. 7D, the first layout 10d may include a first standard cell SC1 and a second standard cell SC2 that are disposed near, or neighboring, one another in the second direction. According to the present exemplary embodiment, a first contact CA of the first standard cell SC1 may include first and second source/drain contact patterns CA_SD1 and CA_SD2, and a first contact CA of the second standard cell SC2 may include first and second power contact patterns CA_P1 and CA_P2.

Since different voltages may be applied to the first and second source/drain contact patterns CA_SD1 and CA_SD2 in the first standard cell SC1 and the third and fourth source/drain contact patterns CA_SD3 and CA_SD4 in the second standard cell SC2, in such a configuration, they may not be connected to one another. Therefore, the first layout 10d may include the first and second source/drain contact patterns CA_SD1 and CA_SD2 and the first and second power contact patterns CA_P1 and CA_P2.

In the first layout 10d, the first and second source/drain contact patterns CA_SD1 and CA_SD2 and the first and second power contact patterns CA_P1 and CA_P2 may form the first contact CA. In detail, as a semiconductor device is scaled down, a distance D0 between the first and second source/drain contact patterns CA_SD1 and CA_SD2 may be less than a patterning resolution limit, and thus, the first and second source/drain contact patterns CA_SD1 and CA_SD2 may not be formed using a single mask. Likewise, a distance D0 between the first and second power contact patterns CA_P1 and CA_P2 may be less than the patterning resolution limit, and thus, the first and second power contact patterns CA_P1 and CA_P2 may not be formed using a single mask.

Also, a distance D1 between the first source/drain contact pattern CA_SD1 and the second power contact pattern CA_P2 is less than the patterning resolution limit, and thus, the first source/drain contact pattern CA_SD1 and the second power contact pattern CA_P2 may not be formed using a single mask. In addition, a distance D4 between the first source/drain contact pattern CA_SD1 and the first power contact pattern CA_P1 may be less than the patterning resolution limit, and thus, the first source/drain contact pattern CA_SD1 and the first power contact pattern CA_P1 may not be formed using a single mask. Therefore, four masks are necessary to form the first contact CA that includes the first and second source/drain contact patterns CA_SD1 and CA_SD2 and the first and second power contact patterns CA_P1 and CA_P2.

As described above, since the first layout 10a of FIG. 7A includes two contact patterns (CA_P1 and CA_P2), two masks are necessary. Since the first layout 10b of FIG. 7B includes three contact patterns (CA_P1, CA_P2, and CA_SD1), three masks are necessary. Although the first layout 10c of FIG. 7C includes four contact patterns (CA_SD1 to CASD4), since the distance D3 between the first and third source/drain contact patterns CA_SD1 and CA_SD3 is greater than the patterning resolution limit, three masks are necessary. However, since the first layout 10d of the FIG. 7D includes four contact patterns (CA_P1, CA_P2, CA_SD1, and CA_SD2) and respective distances between the contact patterns are less than the patterning resolution limit, four masks are necessary.

As the number of masks necessary for forming the first contact CA increases, the manufacturing cost of the IC tends to increase. However, during an IC design process, in particular, during a standard cell library preparation process (S110 of FIG. 1), it may not be possible to predict adjacent standard cells. Therefore, it may not be possible to design a layout of each standard cell with regard to the number of masks.

As described above with reference to FIGS. 7A to 7D, a single layer in a designed IC, for example, the first contact CA, may include a plurality of patterns, for example, the first and second power contact patterns CA_P1 and CA_P2 or the first and second source/drain contact patterns CA_SD1 and CA_SD2. Therefore, the single layer in the designed IC may be formed by being patterned by using a plurality of masks that correspond to the plurality of patterns. In the layer that is patterned by using the plurality of masks, during an IC design process, in particular, during a standard cell layout design process, the plurality of patterns may be designed by using a plurality of colors that respectively correspond to the plurality of patterns by performing color decomposition.

Since the first contact CA in the first layout 10d of FIG. 7D includes four patterns (CA_SD1, CA_SD2, CA_P1, and CA_P2), four masks are necessary. In this case, if patterning is performed by using three masks, color violation occurs among the four patterns (CA_SD1, CA_SD2, CA_P1, and CA_P2) that are designed using four different colors. Accordingly, a color conflict problem may occur due to same color violation in a process of placing and routing standard cells that define the IC.

According to the exemplary embodiment, when the number of masks for forming a first layer from among a plurality of layers that form the IC, for example, the first contact CA, is greater than a threshold value (for example, four), a first layout may be modified to a second layout. For example the first layout may be modified by performing design polishing, or other process, to reduce the number of masks needed in the mask data preparation process. Therefore, design polishing may be performed on the first layout 10d FIG. 7D in a mask data preparation process to form a second layout. Hereinafter, exemplary embodiments of design polishing will be described in detail with reference to FIGS. 8 to 13.

Figure 8:
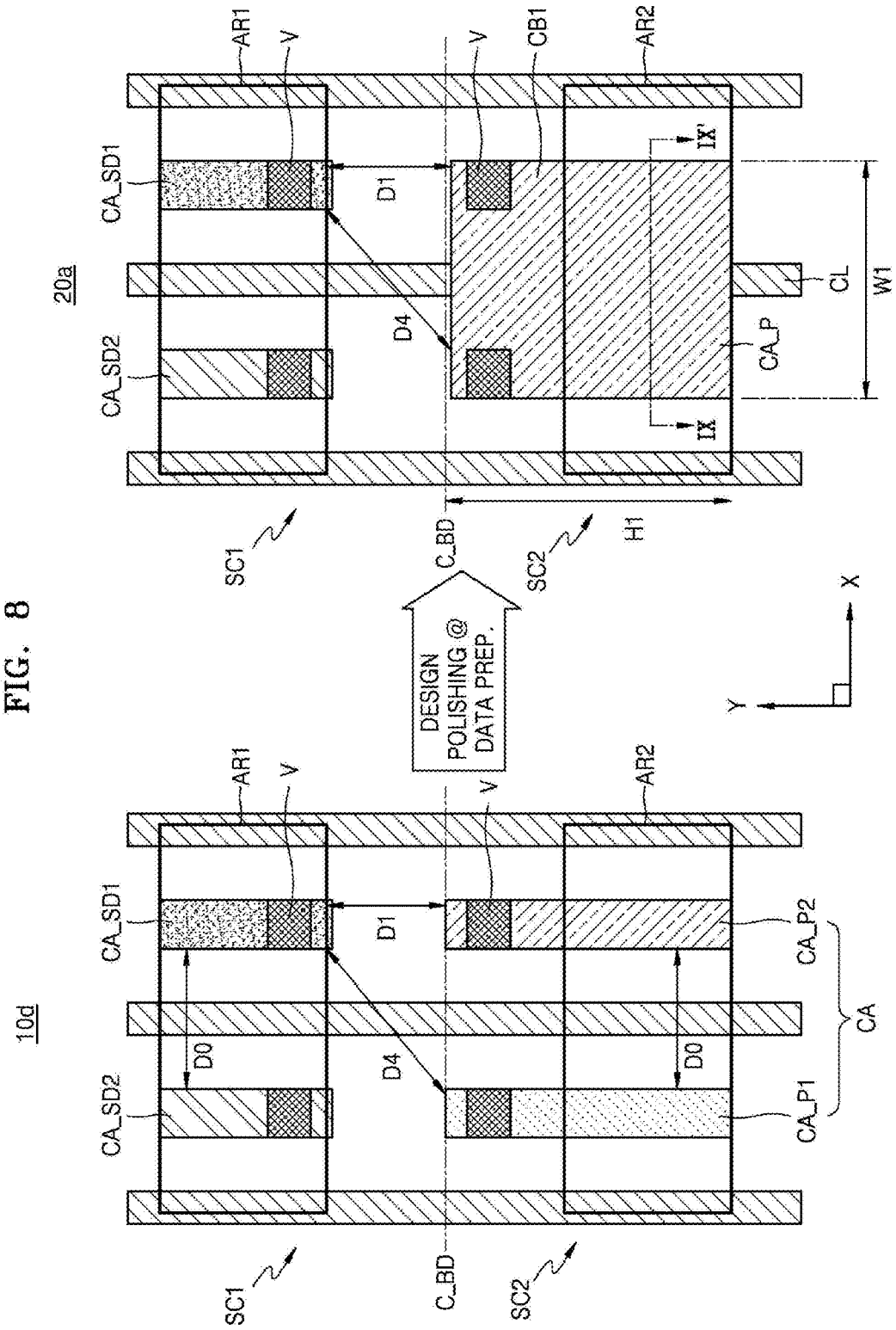
FIG. 8 is an exemplary diagram of a second layout modified from a first layout by design polishing, according to an exemplary embodiment of the inventive concepts.

FIG. 8 is an exemplary diagram of a second layout 20a modified from the first layout 10d by design polishing, according to an exemplary embodiment.

Referring to FIG. 8, in some embodiments, the second layout 20a may be generated by merging the first and second power contact patterns CA_P1 and CA_P2 of the first layout 10d, during the mask data preparation process. Here, the first and second power contact patterns CA_P1 and CA_P2 may be connected to each other since an identical voltage level may be applied to the first and second power contact patterns CA_P1 and CA_P2.

In detail, the first and second power contact patterns CA_P1 and CA_P2, which are designed using different colors in the first layout 10d, may be modified into a single power contact pattern CA_P that is designed using an identical color in the second layout 20a. Accordingly, if an IC is manufactured based on the second layout 20a, the first contact CA may be patterned by using three masks that respectively correspond to three patterns, i.e., the first and second source/drain contact patterns CA_SD1 and CA_SD2 and the power contact pattern CA_P.

The power contact pattern CA_P in the second layout 20a has a first width W1 in a first direction (e.g., X direction) and a first height H1 in a second direction (e.g., Y direction). Like the first layout 10d, two vias V may be forming on the power contact pattern CA_P in the second layout 20a.

The first width W1 may be substantially the same as a total sum of respective widths of the first and second power contact patterns CA_P1 and CA_P2 and the distance D0 between the first and second power contact patterns CA_P1 and CA_P2 in the first layout 10d. However, in various embodiments, the first width W1 is not limited thereto, and may be less or greater than the total sum of the respective widths of the first and second power contact patterns CA_P1 and CA_P2 and the distance D0 between the first and second power contact patterns CA_P1 and CA_P2 in the first layout 10d.

The first height H1 may be substantially the same as respective heights of the first and second power contact patterns CA_P1 and CA_P2 in the first layout 10d. However, in various embodiments, the first height H1 is not limited thereto, and may be less or greater than the respective heights of the first and second power contact patterns CA_P1 and CA_P2 in the first layout 10d.

Therefore, according to the present exemplary embodiment, the second layout 20a may require one less mask for forming the first contact CA than the first layout 10d. In other words, when an IC is manufactured by using the second layout 20a, the first contact CA may be formed by using three masks.

Figure 9A:
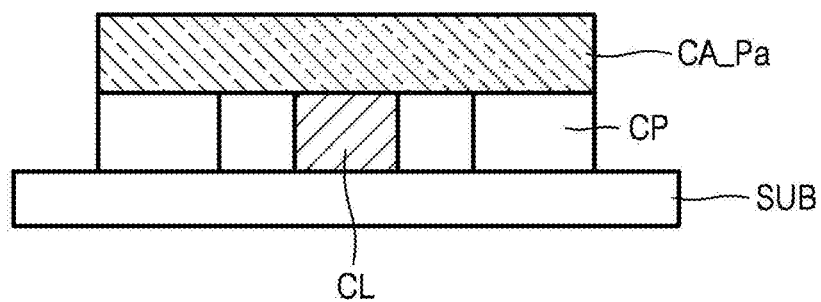
FIGS. 9A and 9B are exemplary sectional views of the second layout cut along the line IX-IX' of FIG. 8.
Figure 9B:
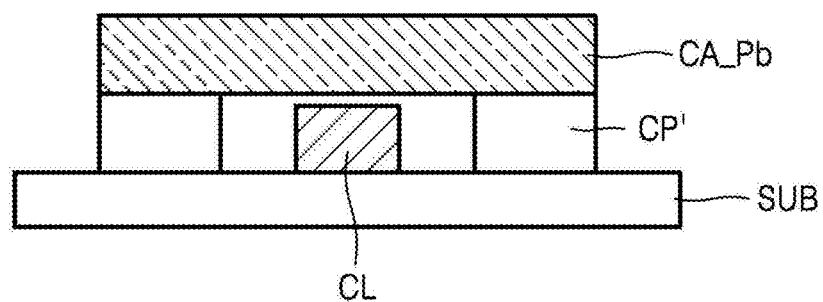

FIGS. 9A and 9B are exemplary sectional views of the second layout 20a cut along the line IX-IX' of FIG. 8.

Referring to FIG. 9A, a semiconductor device 200a may include a substrate SUB, a conductive line CL, a contact plug CP, and a power contact CA_Pa. Although not illustrated, for example, a metal line, which provides power voltages or ground voltages, and a via, which connects the metal line and the power contact CA_Pa, may be additionally provided on the power contact CA_Pa.

The substrate SUB may comprise a semiconductor substrate that includes a material selected from, for example, silicon, SOI, SOS, germanium, silicon germanium, and gallium arsenide. The substrate SUB may be a p-type substrate. Although not illustrated, in some embodiments, the substrate SUB may include an active area that is doped with impurities.

In some embodiments, the conductive line CL may be disposed on the substrate SUB. According to an exemplary embodiment, the conductive line CL may be used as a gate electrode. In this case, a gate insulating layer may be additionally disposed between the conductive line CL and the active area of the substrate SUB.

According to an exemplary embodiment, the conductive line CL may be a dummy conductive line. In a case where the conductive line CL is a dummy conductive line, a cell boundary may exist between the first power contact pattern CA_P1 and the second power contact pattern CA_P2 in the first layout 10d of FIG. 8. The first power contact pattern CA_P1 and the second power contact pattern CA_P2 may be separately included in different standard cells.

The contact plug CP may be disposed on the substrate SUB at a substantially same level or height above the substrate as the conductive line CL. Therefore, the power contact CA_Pa may be connected to the conductive line CL. The contact plug CP may be disposed on a portion of the substrate SUB and electrically connect the power contact CA_Pa and the substrate SUB together.

The power contact CA_Pa may be disposed on the contact plug CP and may be electrically connected to the contact plug CP. Therefore, the power contact CA_Pa may provide, for example, power voltages or ground voltages to the active area of the substrate SUB.

Referring to FIG. 9B, a semiconductor device 200b may include a substrate SUB, a conductive line CL, a contact plug CP', and a power contact CA_Pb. Although not illustrated, for example, a metal line, which provides power voltages or ground voltages, and a via, which connects the metal line and the power contact CA_Pb, may be additionally provided on the power contact CA_Pb.

In some embodiments, the substrate SUB may comprise a semiconductor substrate that includes a material selected from, for example, silicon, SOI, SOS, germanium, silicon germanium, and gallium arsenide. In some embodiments, the substrate SUB may be a p-type substrate. Although not illustrated, the substrate SUB may optionally include an active area that is doped with impurities.

The conductive line CL may be disposed on the substrate SUB. According to an exemplary embodiment, the conductive line CL may be used as a gate electrode. In this case, a gate insulating layer may be additionally disposed between the conductive line CL and the substrate SUB. According to an exemplary embodiment, the conductive line CL may be an active conductive line.

In some embodiments, the contact plug CP' may be disposed on the substrate SUB and be formed higher than the conductive line CL. Therefore, in this example, the power contact CA_Pb may not be connected with the conductive line CL. The contact plug CP' may be disposed on a portion of the substrate SUB and electronically connect the power contact CA_Pb and the substrate SUB together.

The power contact CA_Pb may be disposed on the contact plug CP' and electrically connected to the contact plug CP. Therefore, the power contact CA_Pb may provide, for example, power voltages or ground voltages to the active area of the substrate SUB.

Figure 10:
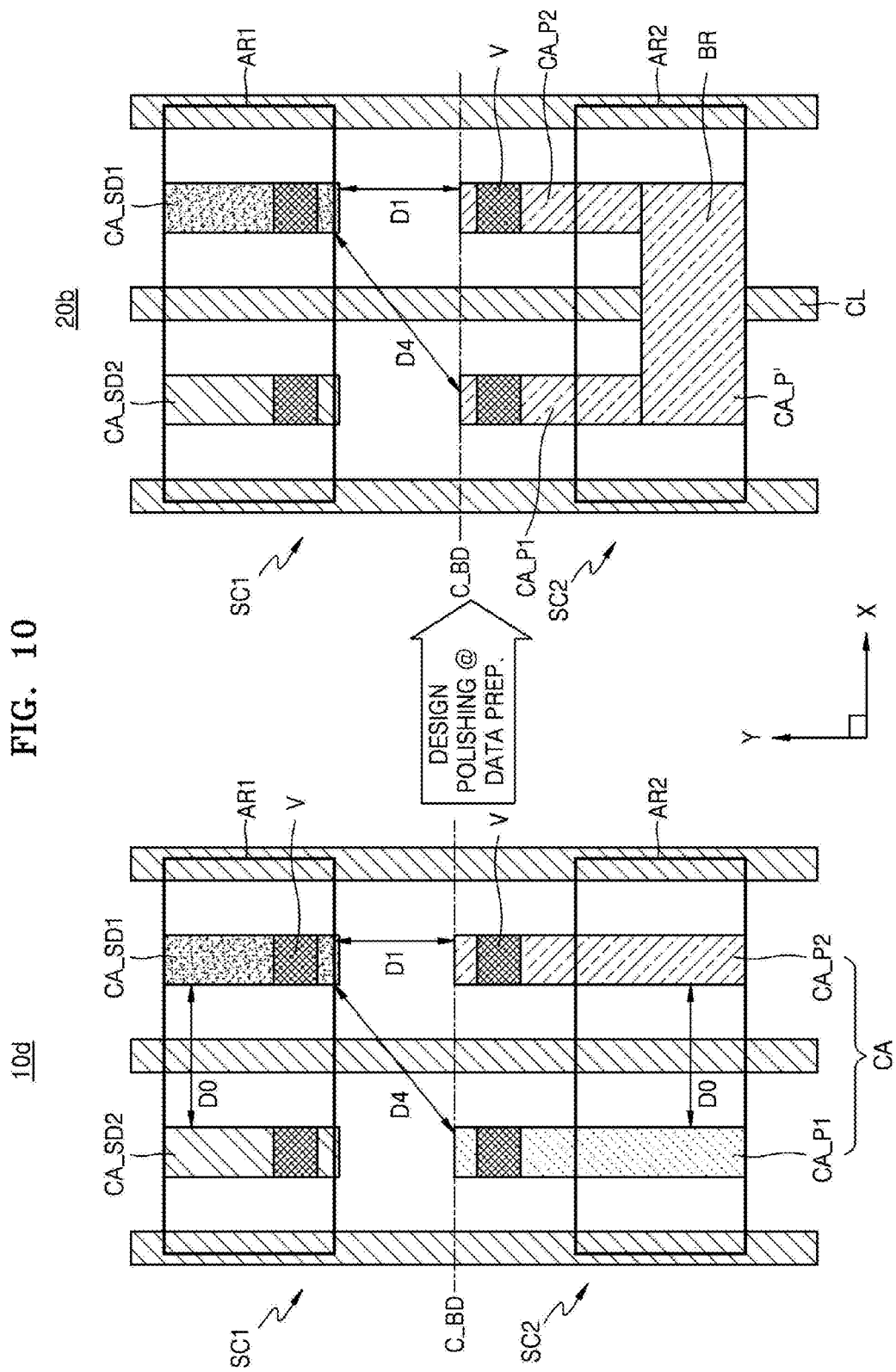
FIG. 10 is another exemplary diagram of a second layout modified from a first layout by design polishing, according to an exemplary embodiment of the inventive concepts.

FIG. 10 is another exemplary diagram of a second layout 20b modified from the first layout 10d by design polishing, according to an exemplary embodiment.

Referring to FIG. 10, the second layout 20b may be generated by adding a bridge pattern BR between the first and second power contact patterns CA_P1 and CA_P2 in the first layout 10d, during the mask data preparation process. Here, the first and second power contact patterns CA_P1 and CA_P2 may be connected to each other since an identical voltage level may be applied to the first and second power contact patterns CA_P1 and CA_P2.

In detail, the first and second power contact patterns CA_P1 and CA_P2, which are designed using different colors in the first layout 10d, may be modified into a power contact pattern CA_P' that is designed using an identical color in the second layout 20b. Accordingly, if an IC is manufactured based on the second layout 20b, the first contact CA may be patterned by using three masks that respectively correspond to three patterns, i.e., the first and second source/drain contact patterns CA_SD1 and CA_SD2 and the power contact pattern CAP'.

The power contact pattern CA_P' in the second layout 20b may include the first and second power contact patterns CA_P1 and CA_P2 and the bridge pattern BR, and may be formed using a single mask. Therefore, the power contact pattern CAP' of the second layout 20b may be shaped as a cross-connecting pattern, for example resulting in a pattern shaped generally as the letter "H." Like the first layout 10d, two vias V may be formed on each of the first and second power contact patterns CA_P1 and CA_P2 in the second layout 20b. Therefore, the power contact pattern CA_P', which includes the first and second power contact patterns CA_P1 and CA_P2 and the bridge pattern BR, may be formed by using a single mask.

Therefore, according to the present exemplary embodiment, the second layout 20b may require one less mask for forming the first contact CA than the first layout 10d. In other words, when an IC is manufactured by using the second layout 20b, the first contact CA may be formed by using three masks.

Figure 11:
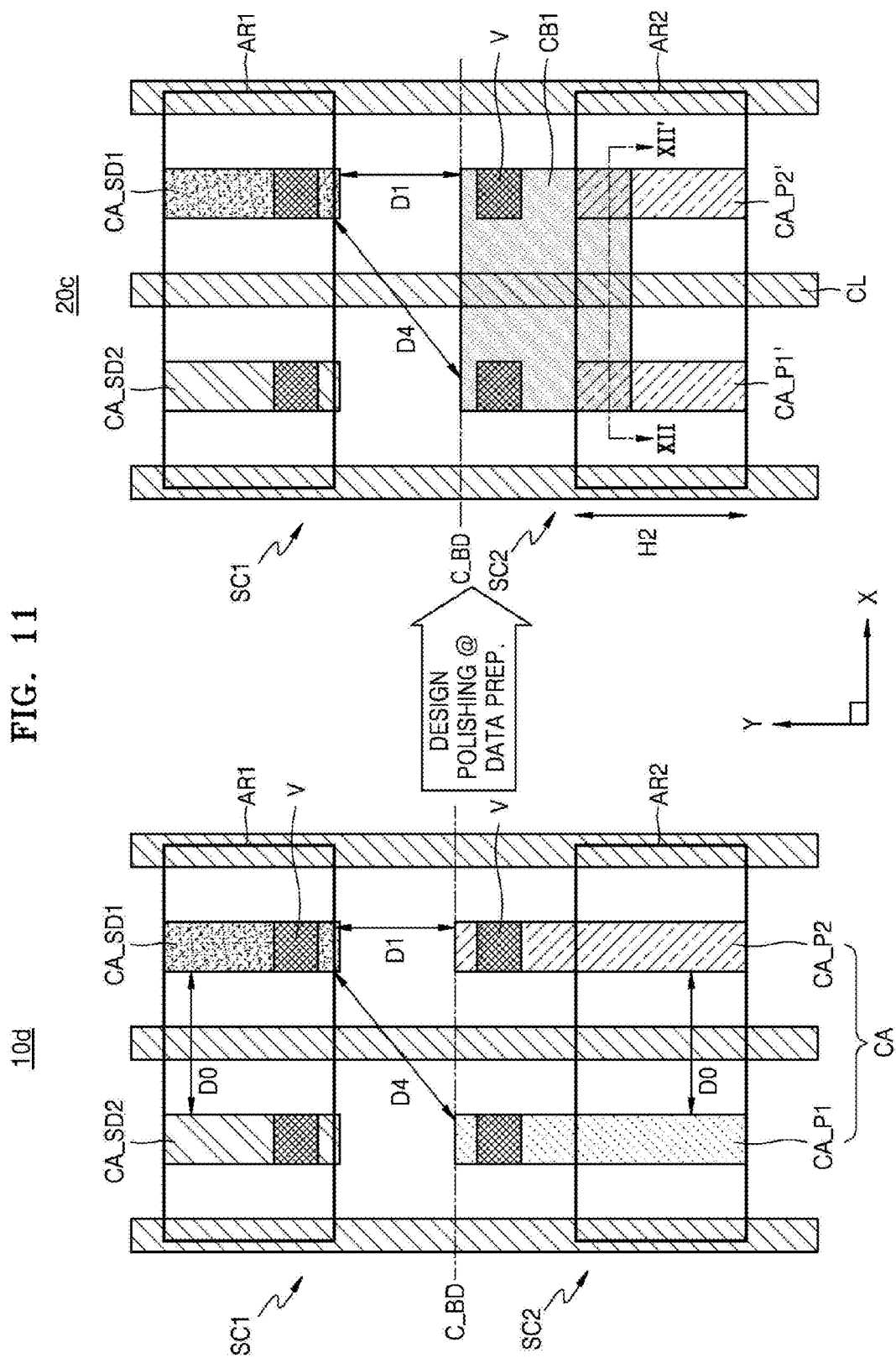
FIG. 11 is another exemplary diagram of a second layout modified from a first layout by design polishing, according to an exemplary embodiment of the inventive concepts.

FIG. 11 is another exemplary diagram of a second layout 20c modified from the first layout 10d by design polishing, according to an exemplary embodiment.

Referring to FIG. 11, during the mask data preparation process, the second layout 20c may be generated by reducing respective heights of the first and second power contact patterns CA_P1 and CA_P2 of the first layout 10d in the second direction, and disposing a second contact CB1 that is connected to the first and second power contact patterns CA_P1 and CA_P2. Here, the first and second power contact patterns CA_P1 and CA_P2 may be connected to each other since an identical voltage level may be applied to the first and second power contact patterns CA_P1 and CA_P2.

In detail, the first and second power contact patterns CA_P1 and CA_P2, which are designed using different colors in the first layout 10d, may be modified into a first and second power contact patterns CA_P1' and CA_P2' that are designed using an identical color in the second layout 20c. Accordingly, if an IC is manufactured based on the second layout 20c, the first contact CA may be patterned by using two masks that respectively correspond to the first and second source/drain contact patterns CA_SD1 and CA_SD2 and a mask that corresponds to the first and second power contact patterns CA_P1' and CA_P2'.

The second layout 20c may have the first and second power contact patterns CA_P1' and CA_P2' that have a second height H2 in the second direction, and the second contact CB1. In this case, the first and second power contact patterns CA_P1' and CA_P2' in the second layout 20c may be formed by using a single mask. In the second layout 20c, the second contact CB1, to which the first and second power contact patterns CA_P1' and CA_P2' are commonly connected, may be disposed on the first and second power contact patterns CA_P1' and CA_P2', and two vias V may be formed on the second contact CB1.

Therefore, according to the present exemplary embodiment, the second layout 20c may require one less mask for forming the first contact CA than the first layout 10d. In other words, when an IC is manufactured by using the second layout 20c, the first contact CA may be formed by using three masks.

Figure 12:
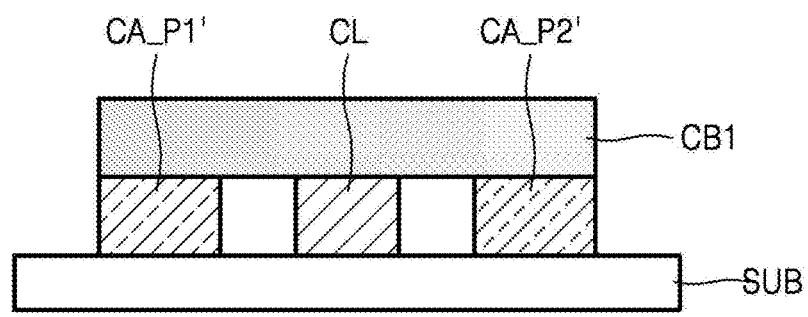
FIG. 12 is an exemplary sectional view of the second layout cut along the line XII-XII' of FIG. 11.

FIG. 12 is an exemplary sectional view of the second layout 20c cut along the line XII-XII' of FIG. 11.

Referring to FIG. 12, a semiconductor device 200c may include a substrate SUB, a conductive line CL, the first and second power contact patterns CA_P1' and CA_P2', and the second contact CB1. Although not illustrated, for example, a metal line, which provides power voltages or ground voltages, and a via, which connects the metal line and the second contact CB1 together, may be additionally provided on the second contact CB1.

The substrate SUB may comprise a semiconductor substrate that includes a material selected from, for example, silicon, SOI, SOS, germanium, silicon germanium, and gallium arsenide. The substrate SUB may be a p-type substrate. Although not illustrated, the substrate SUB may include an active area that is doped with impurities.

The conductive line CL may be disposed on the substrate SUB. According to an exemplary embodiment, the conductive line CL may be used as a gate electrode. In this case, a gate insulating layer may be additionally disposed between the conductive line CL and the substrate SUB.

According to an exemplary embodiment, the conductive line CL may be a dummy conductive line. In a case where the conductive line CL is a dummy conductive line, a cell boundary may exist between the first power contact pattern CA_P1 and the second power contact pattern CA_P2 in the first layout 10d of FIG. 11. The first power contact pattern CA_P1 and the second power contact pattern CA_P2 may be separately included in different standard cells.

The first and second power contact patterns CA_P1' and CA_P2' may be disposed on the substrate SUB at a substantially same level as the conductive line CL. Therefore, the second contact CB1 may be connected to the conductive line CL. The first and second power contact patterns CA_P1' and CA_P2' may be disposed on a portion of the substrate SUB, in particular, in a second active area AR2.

The second contact CB1 may be disposed on the first and second power contact patterns CA_P1' and CA_P2' and commonly connected to the first and second power contact patterns CA_P1' and CA_P2'. Therefore, the second contact CB1 may provide, for example, power voltages or ground voltages to the second active area AR2 in the substrate SUB.

Figure 13:
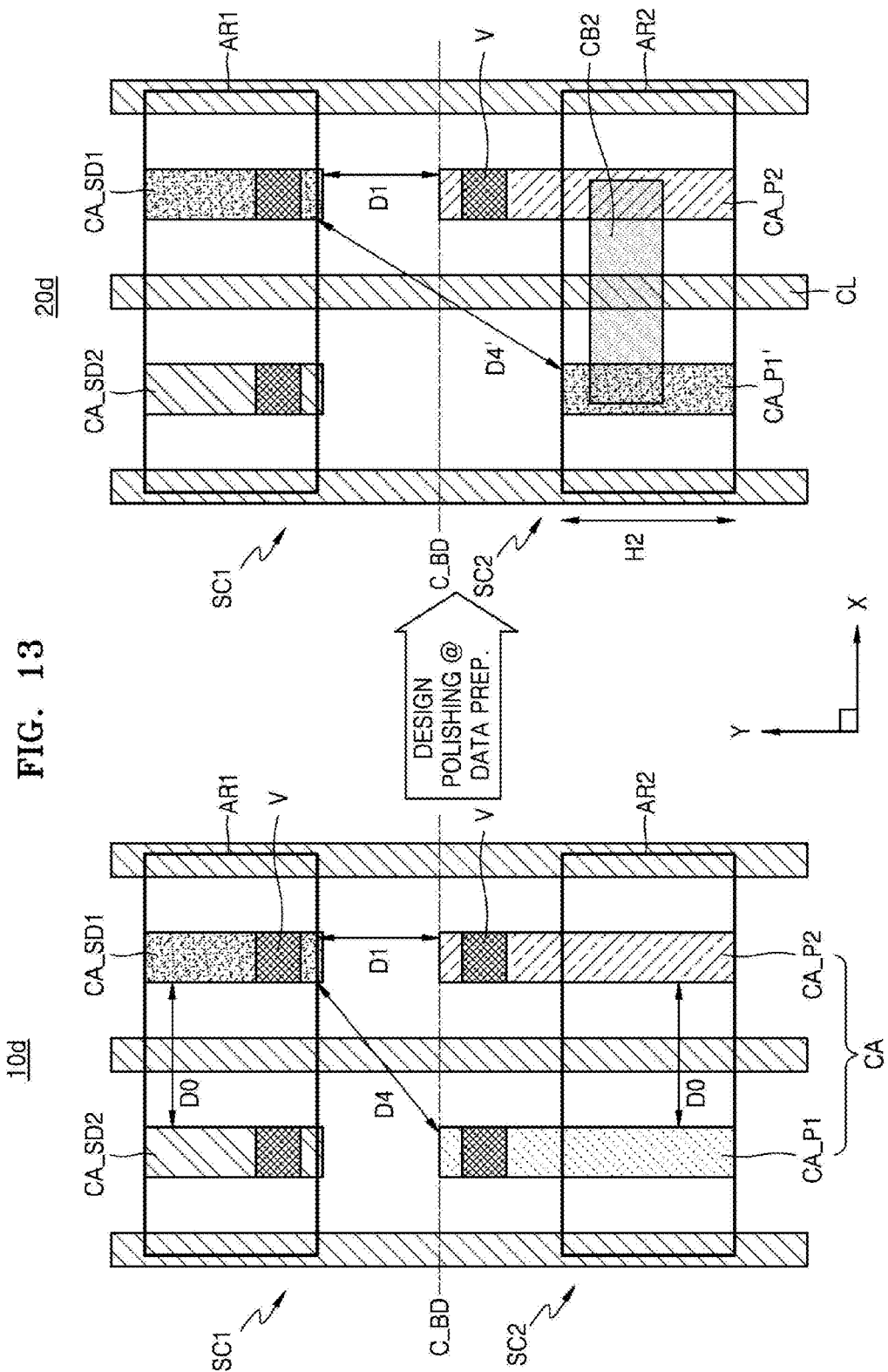
FIG. 13 is another exemplary diagram of a second layout modified from a first layout by design polishing, according to an exemplary embodiment of the inventive concepts.

FIG. 13 is another exemplary diagram of a second layout 20d modified from the first layout 10d by design polishing, according to an exemplary embodiment.

Referring to FIG. 13, the second layout 20d may be generated by reducing a height of the first power contact pattern CA_P1 of the first layout 10d in the second direction, and disposing a second contact CB2 that is connected to the first and second power contact patterns CA_P1 and CA_P2, during the mask data preparation process. Here, the first and second power contact patterns CA_P1 and CA_P2 may be connected to each other since an identical voltage level may be applied to the first and second power contact patterns CA_P1 and CA_P2.

In detail, although the first power contact pattern CA_P1 of the first layout 10d is designed using a different color from the first source/drain contact pattern CA_SD1, in the second layout 20d, the first power contact pattern CA_P1' may be modified such that the first power contact pattern CAPP has the same color as the first source/drain contact pattern CA_SD1. Accordingly, if an IC is manufactured based on the second layout 20d, the first power contact pattern CA_P1' and the first source/drain contact pattern CA_SD1 may be patterned by using the same mask. Therefore, when an IC is manufactured based on the second layout 20d, the first contact CA may be patterned using three masks.

The second layout 20d may include a first power contact pattern CA_P1' that has a second height H2 in the second direction, the second power contact pattern CA_P2, and the second contact CB2. A distance D4' between the first source/drain contact pattern CA_SD1 and the first power contact pattern CA_P1' may be greater than a patterning resolution limit, and thus, the first source/drain contact pattern CA_SD1 and the first power contact pattern CA_P1' may be formed using a single mask.

The second layout 20d may have a bridge pattern on the first and second power contact patterns CA_P1' and CA_P2. The second contact CB2 disposed in the second layout 20d may be connected to the first and second power contact patterns CA_P1' and CA_P2. In the second layout 20d, since a height of the first power contact pattern CA_P1' is reduced, a via V may be formed only on the second power contact pattern CA_P2.

Therefore, according to the present exemplary embodiment, the second layout 20d may require one less mask for forming the first contact CA than the first layout 10d. In other words, when an IC is manufactured by using the second layout 20d, the first contact CA may be formed by using three masks.

Figure 14:
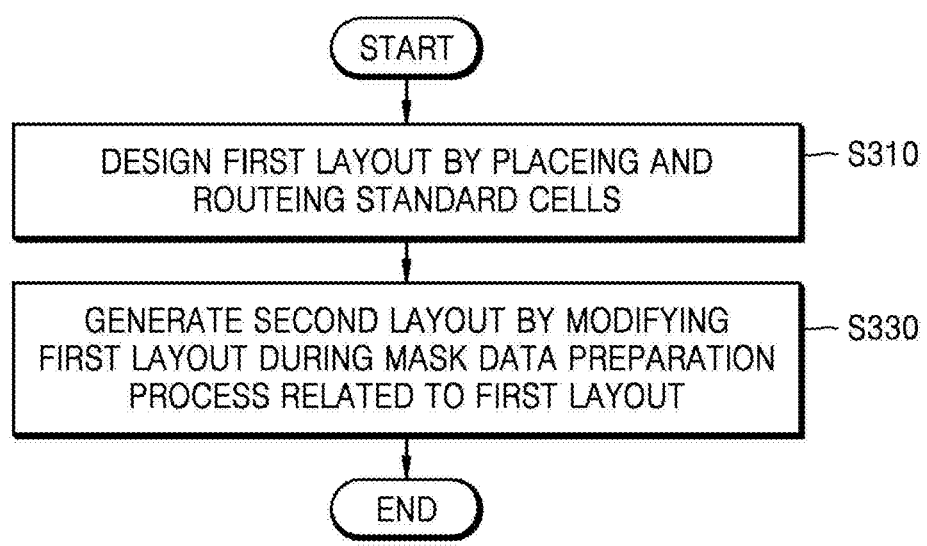
FIG. 14 is a flowchart illustrating a method of designing a layout of an IC, according to an exemplary embodiment of the inventive concepts.

FIG. 14 is a flowchart illustrating a method of designing a layout of an IC, according to an exemplary embodiment.

Referring to FIG. 14, in comparison to the method of FIG. 1, the method of designing a layout of an IC according to the present exemplary embodiment does not include an IC manufacturing process. Operations S110 to S230 may be applied to the present exemplary embodiment. Therefore, the features described with reference to FIGS. 2 to 13 may also be applied to the present exemplary embodiment.

In operation S310, a first layout is designed by placing and routing a plurality of standard cells that define an IC.

In operation S330, a second layout is generated by changing the first layout during a mask data preparation process related to the first layout. In detail, in order to reduce the number of masks necessary for forming a first layer of the first layout, the second layout may be generated by connecting first and second patterns in first layer patterns corresponding to the first layer of the first layout.

According to an exemplary embodiment, the first layer may be a contact (e.g., the first contact CA, or other contacts described herein) that is electrically connected to an active area of an IC and is to be formed on the active area. According to an exemplary embodiment, the first and second patterns may be disposed in parallel to each other in a first direction and extending in a second direction that is substantially perpendicular to the first direction. For example, the first and second patterns may be the first and second power contact patterns CA_P1 and CA_P2 of the first layout 10d shown in FIG. 7D. According to an exemplary embodiment, the first layer patterns may additionally include a third pattern. For example, the third pattern may be the first source/drain contact pattern CA_SD1 of the first layout 10d shown in FIG. 7D.

According to an exemplary embodiment, a second layout (e.g., the second layout 20a of FIG. 8 or other second layouts described herein) may be generated by merging first and second power contact patterns. The generated second layout may have a first width that is greater than respective widths of the first and second power contact patterns in a first direction and may include a new pattern that may be formed using a single mask.

According to another exemplary embodiment, a second layout (e.g., the second layout 20b of FIG. 10 or other second layouts described herein), which includes first and second power contact patterns and a bridge pattern that connects the first and second power contact patterns, may be generated. The generated second layout may be shaped as the letter "H," and include a new pattern that may be formed using a single mask.

According to another exemplary embodiment, a second layout (e.g., the second layout 20c of FIG. 11 or other second layouts described herein) is generated by reducing respective heights of first and second power contact patterns in the second direction. The generated second layout may include new first and second power contact patterns that may be formed using a single mask, and a second layer that is commonly connected to the new first and second power contact patterns. The second layer may be a second contact that is to be formed on at least one selected from a plurality of conductive lines and on the new first and second power contact patterns.

According to another exemplary embodiment, a second layout (e.g., the second layout 20d of FIG. 13 or other second layouts described herein) may be generated. The generated second layout may include a new first power contact pattern of which a height is reduced in a second direction to be smaller than respective heights of the first and second power contact patterns in the second direction such that a distance between the new first power contact pattern and a first source/drain contact pattern is greater than a threshold distance, and a second power contact pattern. Also, the new first power contact pattern may be formed using the same mask as the first source/drain contact pattern. In addition, the generated second layout may further include a second layer that is Banned as a bridge that connects the new first power contact pattern and the second power contact pattern together. The second layer may be a second contact that is to be formed on at least one selected from a plurality of conductive lines, the new first power contact pattern, and the second power contact pattern.

According to an exemplary embodiment, first and second power contact patterns may be included in a first standard cell, and patterns other than the first and second power contact patterns from among first layer patterns may be included in a second standard cell that is adjacent to the first standard cell in a second direction.

According to another exemplary embodiment, the first power contact pattern may be included in a first standard cell, the second power contact pattern may be included in a second standard cell that is adjacent to the first standard cell in a first direction, and patterns other than the first and second power contact patterns from among the first layer patterns may be included in a third standard cell that is adjacent to one of the first and second standard cells in the second direction.

Figure 15:
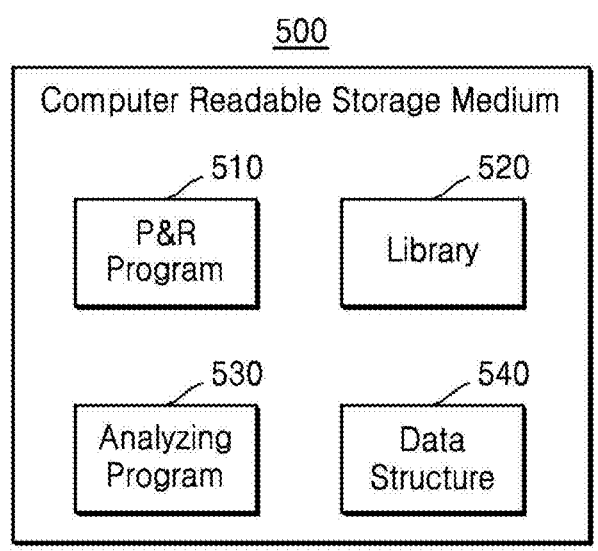
FIG. 15 is a block diagram illustrating a storage medium according to an exemplary embodiment of the inventive concepts.

FIG. 15 is a block diagram illustrating a computer-readable storage medium 500 according to an exemplary embodiment.

Referring to FIG. 15, examples of the computer-readable storage medium 500 may include any storage medium that may be read by a computer while the storage medium is used to provide commands and/or data to a computer, such as a magnetic or optical storage medium (e.g., disks, tapes, CD-ROM, DVD-ROM, CD-R, CD-RW, DVD-R, or DVD-RW), volatile or non-volatile memory (e.g., flash memory, non-volatile memory that may be accessed via a USB interface, and microelectromechanical systems (MEMS). The computer-readable storage medium 500 may be inserted into a computer, integrated into the computer, or combined with the computer via a communication medium such as a network and/or a wireless link.

As shown in FIG. 15, the computer-readable storage medium 500 may include a place and route (P&R) program 510, a library 520, an analyzing program 530, and a data structure 540. The P&R program 510 may include a plurality of commands to perform a method of designing an IC by using a standard cell library according to an exemplary embodiment. For example the computer-readable storage medium 500 may store the P&R program 510 that includes commands for designing an IC by using a standard cell library that includes a standard cell shown in at least one of the previous drawings. The library 520 may include information about standard cells that define the IC.

The analyzing program 530 may include a plurality of commands for performing a method of analyzing the IC according to IC defining data. For example, the computer-readable storage medium 500 may store the analyzing program 530 that includes commands for determining whether the number of masks necessary for forming a first layer of a first layout that is designed by place and route the standard cells that define the IC. The data structure 540 may include storage spaces for managing data generated when using the standard cell library of the library 520, extracting information from a general standard cell library in the library 520, or analyzing properties of the IC by using the analyzing program 530.

Figure 16:
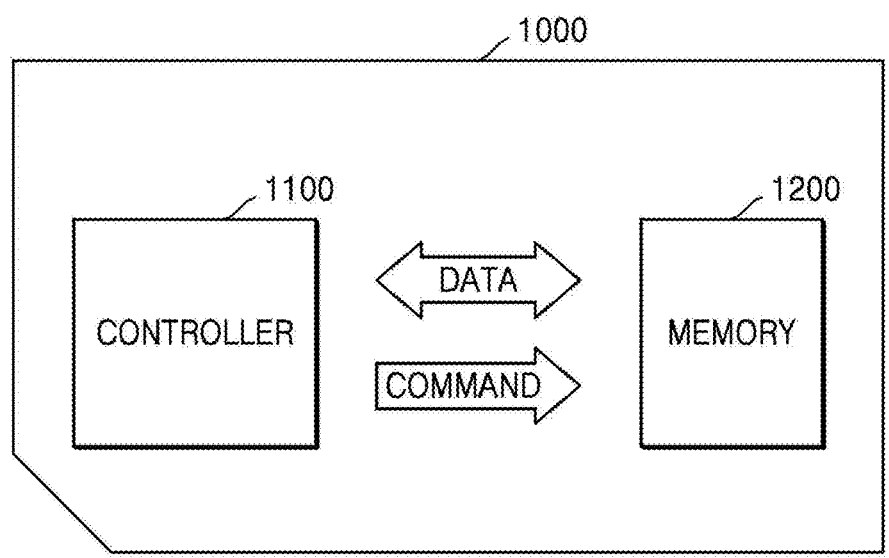
FIG. 16 is a block diagram illustrating a memory card that includes an IC according to an exemplary embodiment of the inventive concepts.

FIG. 16 is a block diagram illustrating a memory card 1000 that includes an IC according to an exemplary embodiment.

Referring to FIG. 16, the memory card 1000 may include a controller 1100 and a memory 1200 that may exchange electric signals with each other. For example, when the controller 1100 transmits a command to the memory 1200, the memory 1200 may transmit data to the controller 1100.

The controller 1100 and the memory 1200 may include an IC according to exemplary embodiments. Specifically, a fin transistor included in at least one semiconductor device from among a plurality of semiconductor devices in the controller 1100 and the memory 1200 may be formed based on a second layout that is modified from a first layout that is designed using a place and route tool during the mask data preparation process. In this case, in order to reduce the number of masks necessary for forming a first layer of the first layout, the second layout may be generated by connecting first and second patterns from among first layer patterns corresponding to the first layer of the first layout.

The memory card 1000 may include any of a variety of memory cards, for example, a memory stick card, a smart media (SM) card, a secure digital (SD) card, a mini SD card, and a multimedia card (MMC).

Figure 17:
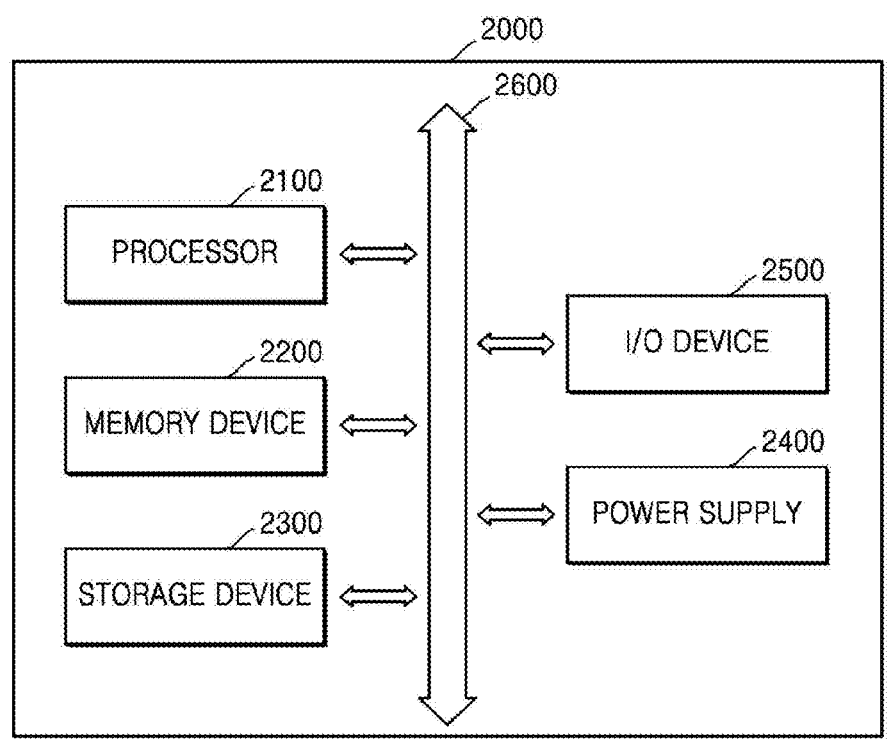
FIG. 17 is a block diagram illustrating a computing system that includes an IC according to an exemplary embodiment of the inventive concepts.

FIG. 17 is a block diagram illustrating a computing system 2000 that includes an IC according to an exemplary embodiment.

Referring to FIG. 17, the computing system 2000 may include a processor 2100, a memory device 2200, a storage device 2300, a power supply 2400, and an input/output (I/O) unit 2500. Although not illustrated in FIG. 17, the computing system 2000 may further include ports for communicating with a video card, a sound card, a memory card, or a USB, or with other electronic devices.

The processor 2100, the memory device 2200, the storage device 2300, the power supply 2400, and the I/O unit 2500 in the computing system 2000 may include an IC according to the exemplary embodiments. In particular, a semiconductor device from among a plurality of semiconductor devices in the processor 2100, the memory device 2200, the storage device 2300, the power supply 2400, and the I/O unit 2500, or, a fin transistor included in a semiconductor device from among the plurality of semiconductor devices may be formed based on a second layout that is modified from a first layout that is designed by a place and route tool during a mask data preparation process. The second layout may be generated by connecting first and second patterns from among first layer patterns corresponding to a first layer of the first layout, so that the number of masks necessary for forming the first layer is reduced.

The processor 2100 may perform specific computations or tasks. According to exemplary embodiments, the processor 2100 may be a micro-processor, a central processing unit (CPU), or the like. The processor 2100 may communicate with the memory device 2200, the storage device 2300, and the I/O unit 2500 via a bus 2600, for example, an address bus, a control bus, and a data bus. According to example embodiments, the processor 2100 may be connected with an extended bus, such as a peripheral component interconnect (PCI) bus.

The memory device 2200 may store data used for operations of the computing system 2000. For example, the memory device 2200 may be implemented as DRAM, mobile DRAM, SRAM, PRAM, FRAM, RRAM and/or MRAM. The storage device 2300 may include, for example, a solid state drive, a hard disk drive, or a CD-ROM.

The I/O unit 2500 may include an input unit such as a keyboard, a keypad, or a mouse, and an output unit such as a printer or a display. The power supply 2400 may supply an operating voltage to the computing system 2000.

ICs according to the exemplary embodiments described above may be implemented as any of a variety of package forms. For example, at least some elements of the IC may be mounted using packages, for example, Package on Package (PoP), Ball grid arrays (BGAs), Chip scale packages (CSPs), Plastic Leaded Chip Carrier (PLCC), Plastic Dual In-Line Package (PDIP), Die in Waffle Pack, Die in Wafer Form, Chip On Board (COB), Ceramic Dual In-Line Package (CERDIP), Plastic Metric Quad Flat Pack(MQFP), Thin Quad Flatpack (TQFP), Small Outline (SOIC), Shrink Small Outline Package (SSOP), Thin Small Outline (TSOP), Thin Quad Flatpack (TQFP), System In Package (SIP), Multi Chip Package (MCP), Wafer-level Fabricated Package (WFP), and Wafer-Level Processed Stack Package (WSP).

While the inventive concepts have been particularly shown and described with reference to exemplary embodiments thereof, it will be understood that various changes in form and details may be made therein without departing from the spirit and scope of the following claims.

What is claimed is:

1. A computer-implemented method of fabricating an integrated chip (IC), the method comprising:
designing a first layout by placing and routing a plurality of standard cells that define the IC;
generating a second layout by modifying the first layout during a mask data preparation process related to the first layout, wherein the second layout is generated by connecting first and second patterns from among first layer patterns corresponding to a first layer of the first layout, such that a single mask is applied to the connected first and second patterns, thereby reducing the number of masks necessary for forming the first layer patterns of the first layer of the IC; and
manufacturing the IC according to the second layout.

2. The method of claim 1, wherein the first and second patterns are positioned in parallel to each other in a first direction and extend in a second direction that is substantially perpendicular to the first direction.

3. The method of claim 2, wherein the generating of the second layout comprises generating the second layout comprising a new pattern that is generated by merging the first and second patterns, has a first width that is greater than respective widths of the first and second patterns in the first direction, and is formed using a single mask.

4. The method of claim 2, wherein the generating of the second layout comprises generating the second layout comprising a new pattern that includes the first and second patterns and a bridge pattern connecting the first and second patterns together using a cross-connecting pattern, and is formed using a single mask.

5. The method of claim 2, wherein the generating of the second layout comprises generating the second layout comprising new first and second patterns that have a smaller height in the second direction than the first and second patterns and are formed using a single mask, and a second layer that is commonly connected to the new first and second patterns.

6. The method of claim 5, wherein the first layout further comprises a plurality of conductive lines that are positioned in parallel to the first and second patterns, and
wherein the second layer is a contact that is to be formed on at least one selected from the plurality of conductive lines and on the new first and second patterns.

7. The method of claim 2, wherein the generating of the second layout comprises generating the second layout that comprises:
a new first pattern that has a smaller height than the first and second patterns in the second direction such that a distance between the new first pattern and a third pattern from among the first layer patterns is the same or greater than a threshold distance, wherein the new first pattern and the third pattern are formed using the same mask; and
a second layer having a form of a bridge that connects the new first pattern and the second pattern.

8. The method of claim 7, wherein the first layout further comprises a plurality of conductive lines that are positioned in parallel to the first and second patterns, and
the second layer is a contact that is to be formed on the new first pattern, the second pattern, and at least one selected from the plurality of conductive lines.

9. The method of claim 1, wherein the first layer comprises a contact that is electrically connected to an active area of the IC and is to be formed on the active area.

10. The method of claim 9, wherein the first and second patterns respectively correspond to first and second power contact patterns.

11. The method of claim 10, wherein the first and second power contact patterns are included in a first standard cell, and patterns other than the first and second power contact patterns from among the first layer patterns are included in a second standard cell that is adjacent to the first standard cell in a second direction in which the first and second patterns extend.

12. The method of claim 10, wherein the first power contact pattern is included in a first standard cell, the second power contact pattern is included in a second standard cell that is adjacent to the first standard cell in a first direction, and patterns other than the first and second power contact patterns from among the first layer patterns are included in a third standard cell that is adjacent to one of the first and second standard cells in a second direction in which the first and second patterns extend.

13. A method of designing a layout of a standard cell of an integrated circuit (IC), the method comprising;
configuring a first layout by placing and routing a standard cell, the standard cell including first and second patterns from among first layer patterns corresponding to a first layer of the first layout;
configuring a second layout by modifying the first layout by connecting the first and second patterns among the first layer patterns so that the number of masks required to form the first layer patterns of the standard cell according to the second layout is reduced relative to the number of masks required to form the first layer patterns of the standard cell according to the first layout; and
manufacturing the integrated circuit based on the second layout.

14. The method of claim 13, wherein the first and second patterns are positioned in parallel to each other in a first direction and extend in a second direction that is substantially perpendicular to the first direction, and wherein the configuring of the second layout comprises at least one of:
configuring the second layout comprising a new pattern that is generated by merging the first and second patterns, has a first width that is greater than respective widths of the first and second patterns in the first direction, and is formed using a single mask;
configuring the second layout comprising a new pattern that includes the first and second patterns and a bridge pattern connecting the first and second patterns together using a cross-connecting pattern, and is formed using a single mask; or
configuring the second layout comprising new first and second patterns that have a smaller height in the second direction than the first and second patterns and are formed using a single mask, and a second layer that is commonly connected to the new first and second patterns.

15. The method of claim 13, wherein the first and second patterns are positioned in parallel to each other in a first direction and extend in a second direction that is substantially perpendicular to the first direction, and wherein the configuring of the second layout comprises generating the second layout that comprises:
a new first pattern that has a smaller height than the first and second patterns in the second direction such that a distance between the new first pattern and a third pattern from among the first layer patterns is the same or greater than a threshold distance, wherein the new first pattern and the third pattern are formed using the same mask; and
a second layer having a form of a bridge that connects the new first pattern and the second pattern.

16. The method of claim 15, wherein the first layout further comprises a plurality of conductive lines that are positioned in parallel to the first and second patterns, and
the second layer is a contact that is to be formed on the new first pattern, the second pattern, and at least one selected from the plurality of conductive lines.

17. The method of claim 16, wherein the first layer comprises a contact that is electrically connected to an active area of the IC and is to be formed on the active area and wherein the first and second patterns respectively correspond to first and second power contact patterns.

* * * * *